(12) United States Patent
Bihday et al.

(10) Patent No.: US 11,868,561 B2
(45) Date of Patent: Jan. 9, 2024

(54) MULTI-PHASE EXCITING AND SCANNING WITH ZERO-SUM SEQUENCES

(71) Applicant: Cypress Semiconductor Corporation, San Jose, CA (US)

(72) Inventors: Volodymyr Bihday, Lviv (UA); Andriy Maharyta, Lviv (UA); Igor Kravets, Lviv (UA); Mykhaylo Krekhovetskyy, Lviv (UA); Ihor Musijchuk, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/331,389

(22) Filed: May 26, 2021

(65) Prior Publication Data

US 2022/0382451 A1 Dec. 1, 2022

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 3/0418* (2013.01); *G06F 3/04164* (2019.05)

(58) Field of Classification Search
CPC ........... G06F 3/041662; G06F 3/04164; G06F 3/0418; G06F 3/044

USPC .................................................. 345/173–174
See application file for complete search history.

(56) References Cited

U.S. PATENT DOCUMENTS

| 10,067,593 | B2 * | 9/2018 | Mohindra | G06F 3/0446 |
| 2012/0056841 | A1 * | 3/2012 | Krenik | G06F 3/04182 |
| | | | | 345/174 |
| 2012/0256870 | A1 * | 10/2012 | Klein | G06F 3/0446 |
| | | | | 345/174 |
| 2013/0021294 | A1 * | 1/2013 | Maharyta | G06F 3/0446 |
| | | | | 345/174 |
| 2018/0364830 | A1 * | 12/2018 | Shepelev | G06F 3/04164 |
| 2019/0196629 | A1 * | 6/2019 | Shepelev | G06F 3/0412 |

* cited by examiner

*Primary Examiner* — Kwin Xie

(57) ABSTRACT

Apparatuses and methods of multi-phase scanning of a touch panel are described. One apparatus selects a sequence having a number of one values, negative one values, and zero values. The one values correspond to an in-phase drive signal, the negative one values correspond to an opposite-phase drive signal, and the zero values correspond to a reference signal (e.g., reference voltage or ground). A sum of the sequence is equal to zero. The apparatus applies one of the in-phase drive signal, the opposite-phase drive signal, or the reference signal to each of a first set of electrodes at a first stage according to the sequence. The apparatus rotates the sequence to obtain a rotated sequence and applies one of the signals according to the rotated sequence. The apparatus receives sense signals to detect a presence of an object on the touch panel.

20 Claims, 19 Drawing Sheets

MULTI-PHASE EXCITING AND SCANNING WITH ZERO-SUM SEQUENCES

TECHNICAL FIELD

Embodiments of the present invention relate to the field of user interface devices and, in particular, to multi-phase exciting and scanning with zero-sum sequences of touch-sensing devices.

BACKGROUND

Computing devices, such as notebook computers, personal data assistants (PDAs), and mobile handsets, have user interface devices, which are also known as human interface devices (HID). One type of user interface device that has become more common is touch-sensing devices, such as touch-sensor pads (also commonly referred to as touchpads), touch-sensor sliders, touch-sensor buttons, touch-sensor keyboard, touchscreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW—surface acoustic wave), or photo-sensitive (infra-red). The effect of such overlays allows a display to be used as an input device, removing the keyboard and/or the mouse as the primary input device for interacting with the display's content. Such displays can be attached to computers or, as terminals, to networks. There are several types of touch screen technology, such as optical imaging, resistive, surface wave, capacitive, infrared, dispersive signal, and strain gauge technologies. Touch screens have become familiar in retail settings, on point of sale systems, on ATMs, on mobile handsets, on game consoles, and on PDAs where a stylus is sometimes used to manipulate the graphical user interface (GUI) and to enter data.

In general, capacitance-sensing devices are intended to replace mechanical buttons, knobs, and other similar mechanical user-interface controls. Capacitance-sensing devices eliminate the complicated mechanical switches and buttons, providing reliable operation under harsh conditions. In addition, capacitance-sensing devices are widely used in modern customer applications, providing new user interface options in the existing products. Capacitive touch sensor elements can be arranged in the form of a sensor array for a touch-sensing surface. When a conductive object, such as a finger, comes in contact or close proximity with the touch-sensing surface, the capacitance of one or more capacitive touch sensor elements changes. An electrical circuit can measure the capacitance changes of the capacitive touch sensor elements. The electrical circuit, supporting one operation mode, converts the measured capacitances of the capacitive touch sensor elements into digital values.

There are two main operational modes in the capacitance-sensing circuits: self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

BRIEF DESCRIPTION OF THE DRAWINGS

The present disclosure is illustrated by way of example, and not by way of limitation, in the figures of the accompanying drawings.

DETAILED DESCRIPTION

Figure 1:
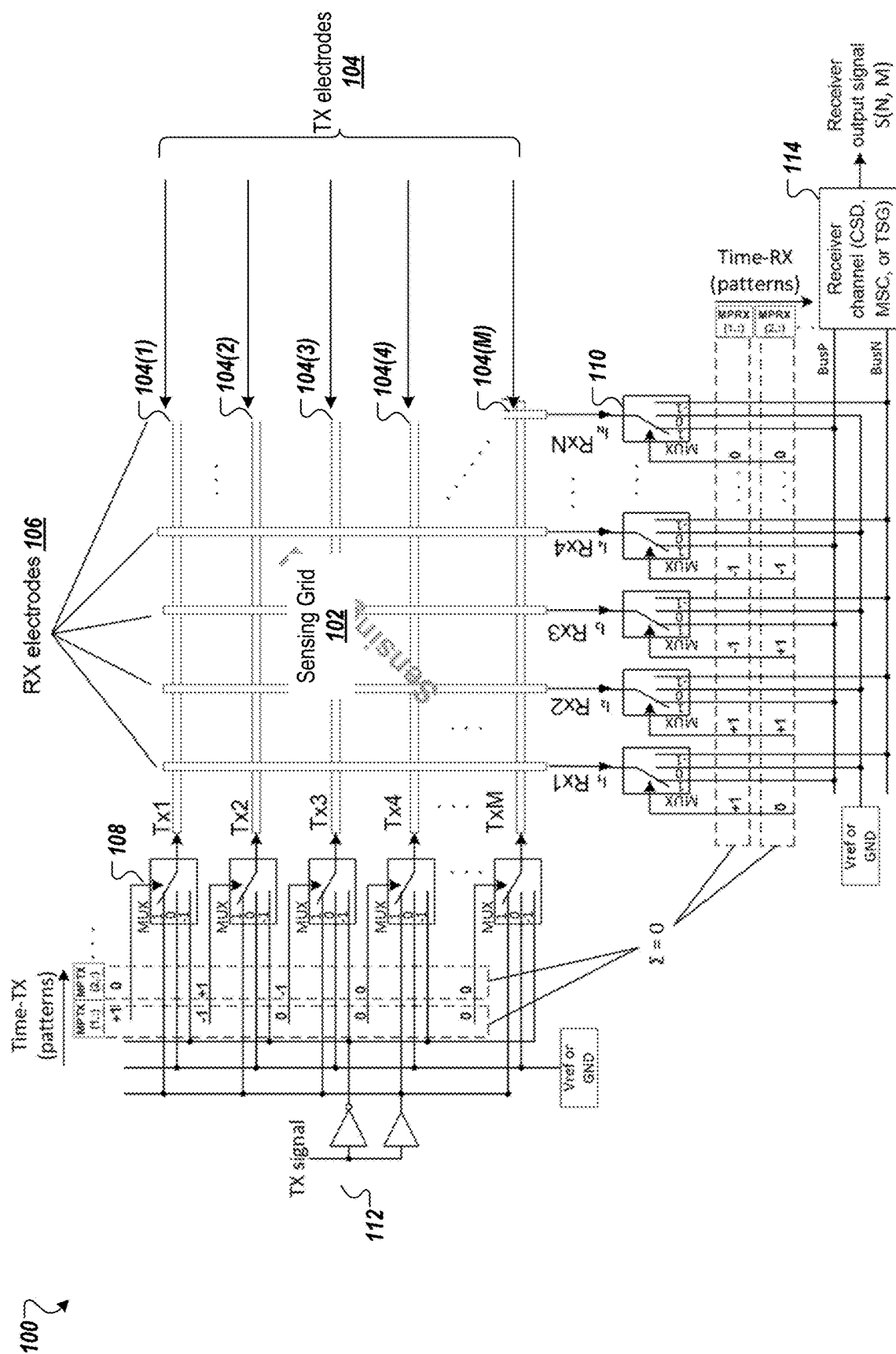
FIG. 1 is a schematic diagram of a capacitance-sensing device according to one embodiment.

Touch panels (e.g., touch screens) that are used in consumer electronics and automotive settings are increasingly utilizing larger screen sizes, for example, greater than 12.3 inches. At the same time, such large screen sizes are subject to stricter specification requirements on radiated electromagnetic emission, particularly in longwave (e.g., frequencies less than approximately 540 kHz) frequencies bands and medium-wave frequency bands (e.g., frequencies between approximately 530 kHz and 1700 kHz). Existing capacitance-sensing devices utilizing square-wave excitations have a radiated electromagnetic emission that exceeds the current limit. Further, the operation of capacitance-sensing devices can be affected by external common-mode noise from sources such as the operation of liquid-crystal display (LCD) screens, electrical ballasts, handheld transceivers, amplitude-modulated (AM) radio, and testing procedures (such as tests in electromagnetic immunity (EMI) and/or electromagnetic compatibility (EMC) chambers). Thus, there is a need for exciting and scanning capacitance-sensing touch panels while minimizing electromagnetic emission and increasing electromagnetic immunity.

Conventional techniques for reducing electromagnetic emission include frequency spreading (e.g., TX spreader) and sine-wave excitation. Frequency spreading is a technique to reduce (e.g., spread) peaks of harmonics in the emission spectrum but modulating square-wave excitation signals. While frequency spreading mitigates electromagnetic emission, it limits a sensing frequency range for large panels and small scanning times, and introduces electromagnetic immunity problems (e.g., decreases the signal-to-noise ratio (SNR), is less robust to LCD noise). As the width of the harmonics increases, the noise transfer function of the receive channel increases, which increases the susceptibility of the system to wideband noise. In the case of sine-wave excitation, only a single harmonic is present in the emission spectrum and the system can be designed to place the main harmonic in a frequency range to minimize noise. However, this can lead to higher power consumption, higher cost, and strict requirements on scanning times and phases. Further sine-wave excitation does not reduce electromagnetic emission compared to square-wave excitation, as the emission energy is similar, but concentrated at the main harmonic. Additionally, because the frequency range is limited, the SNR is decreased.

Described herein are various embodiments of apparatuses and methods of multi-phase scanning exciting and scanning with zero-sum sequences for touch panels. The apparatuses and methods described allow for touch panels that have a sufficiently low electromagnetic emission and a sufficiently high SNR. In particular, the methods described herein allow for multi-phase transmission to reduce electromagnetic emission and multi-phase receive to suppress external common-mode noise. The methods described herein support white-noise mitigation (such as multi-phase scanning), apply to both mutual capacitance sensing and self-capacitance sensing, and support multi-touch properties of touch panels.

Apparatuses and methods of multi-phase transmit and receive are described. Multi-phase transmit refers to a method of exciting electrodes in which more than one electrode is excited simultaneous with excitation signals with different phases. Multi-phase receive refers to a panel scanning technique for systems in which the number of sensors is larger than the number of receiver channels. In one embodiment, capacitance-sensing circuitry generates an in-phase drive signal and an opposite-phase drive signal and generates a sequence with a number of positive one values, negative one values, and zero values. The positive one values correspond to the in-phase drive signal, the negative one values correspond to the opposite-phase drive signal, and the zero values correspond to a reference signal from a voltage potential or a ground potential. A sum of the sequence (e.g., a sum of each of the positive one values, negative one values, and zero values in the sequence) is zero. In one embodiment, the capacitance-sensing circuitry applies, according to the sequence, one of the in-phase drive signal, the opposite-drive signal, or the reference signal to a first set of transmitter (TX) electrodes at a first stage of a number of scanning stages. The capacitance-sensing circuitry rotates the sequence to obtain a rotated sequence. The capacitance-sensing circuitry applies, according to the rotated sequence, one of the in-phase drive signal, the opposite-drive signal, or the reference signal to a second set of transmitter (TX) electrodes at a second stage of a number of scanning stages. The capacitance-sensing circuitry receives sense signals from a set of receiver electrodes to detect a presence of an object on a touch panel. The sense signals represent capacitance associated with the set of receiver electrodes. It should be noted that the capacitance-sensing circuitry can detect conductive objects, as well as other objects (also referred to as touch objects). An object, or touch object, is any object that disturbs the electrical field and reduces the coupling between the receiver and transmitter electrodes for the mutual capacitance sensing techniques. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes. It should also be noted that the embodiments described herein can be used on touch panels having more than two transmitter electrodes and receiver electrodes as described below.

The embodiments described herein provide a multi-phase TX and RX technique that reduces electromagnetic emission and improves electromagnetic immunity such that capacitance sensing can be applied to large touch screens (e.g., larger than 12.3 inches). This technique is based on requiring that a sum of the sequence corresponding to in-phase drive signals, opposite-phase drive signals, and reference signals vanish, thus minimizing electromagnetic emission. Further, this technique is based on determining a deconvolution circular matrix that is a pseudoinverse of an excitation matrix that is singular (e.g., cannot be inverted) and calculating deconvoluted data using the deconvolution circular matrix and the sensing signals (digital data), and reconstructing a touch signal on a capacitance-sensing touch screen. In some cases, this technique relies on applying appropriate filtering techniques (such as common-mode filtering, orthogonal common-mode filtering, neural network-based filtering, etc.) and/or post-processing algorithms (in which case there may not be a need to apply filtering). The embodiments described herein may be used in various touch-sensing devices, including Indium Tin Oxide (ITO) based designs.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

FIG. 1 is a schematic diagram of a capacitance-sensing device 100 according to one embodiment. Capacitance-sensing device 100 is a zero-sum multi-phase capacitance-sensing device. Capacitance-sensing device 100 provides at least one example of multi-phase exciting and scanning with a zero-sum sequence to support various capacitance-sensing modes, such as mutual capacitance or self-capacitance. FIG. 1 illustrates a capacitance-sensing device with a touch-controller architecture that has a sensing grid 102 (e.g., a sense panel or a capacitance matrix) with a rectangular array of sense electrodes. The rectangular array of sense electrodes can include an integer number, M, of TX electrodes 104 and an integer number, N, of RX electrodes 106. TX multiplexers 108 and RX multiplexers 110 can connect the panel electrodes to one or more sense channels and multiplex signals between the in-phase drive signal, the opposite-phase drive signal, and the reference signal.

Capacitance-sensing device 100 may include capacitance-sensing circuitry which can be capable of one or both transmitting and receiving. In some embodiments TX signal generator 112 can generate an in-phase drive signal and an opposite-phase drive signal and select an excitation sequence having a number of positive ones, negative ones, and zeros corresponding to the in-phase drive signals, the opposite-phase drive signals, and reference signals respectively. The excitation sequence can be selected such that the sum of the excitation sequence is zero. In the case where the excitation sequence has a sum of zero, the excitation sequence can be referred to as a zero-sum excitation sequence. At a first stage of scanning, TX signal generator 112 can apply at least one of the in-phase drive signal, the opposite-phase drive signal, or the reference signal to TX electrodes 104 simultaneously and according to the excitation sequence. The in-phase drive signals, the opposite-phase drive signals, and the reference signals are applied to TX electrodes 104 according to the excitation sequence. The excitation sequence can be selected such that the sum of the excitation sequence is zero. The excitation sequence can be rotated and at a second scanning stage, TX signal generator 112 applies at least one of the in-phase drive signal, the opposite-phase drive signal, or the reference signal to TX electrodes 104 simultaneously and according to the rotated excitation sequence. Further, an RX signal receiver 114 can receive a sense signal from RX electrodes 106 to detect a presence of an object (such as a finger or other conductive object) on a touch panel of capacitance-sensing device 100. The sense signals represent capacitances associated with RX electrodes 106.

In some embodiments, at the first scanning stage, RX signal receiver 114 can sense at least one of the in-phase drive signal, the opposite-phase drive signal, or the reference signal according to the excitation sequence. The RX signal receiver 114 senses the signals at RX electrodes 106 at substantially the same time. At the second scanning stage, RX signal receiver 114 can sense at least one of the in-phase drive signal, the opposite-phase drive signal, or the reference signal according to the rotated excitation sequence. The sense signals can be representative of capacitances associated with receiver electrodes 106, and can be received by RX signal receiver 114 to detect a presence of an object on the touch panel.

As depicted in FIG. 1, at the first stage of scanning, the excitation sequence (e.g., excitation pattern) selected by TX signal generator 112 is $\{+1, -1, 0, 0, \ldots, 0\}$ which indicates that, as multiplexed by TX multiplexers 108, an in-phase drive signal is applied to TX electrode 104(1), an opposite-phase drive signal is applied to TX electrode 104(2), and a reference signal is applied to TX electrodes 104(3) to 104(M). Each of the signals corresponding to the excitation sequence can be applied to TX electrodes substantially at the same time. At the second stage of scanning, the excitation sequence can be rotated (or cycled) such that the rotated excitation sequence is $\{0, +1, -1, 0, 0, \ldots, 0\}$. In other words, the "0" that was applied to TX electrode 104(M) can be shifted to be applied to TX electrode 104(1), the "1" that was applied to TX electrode 104(1) is shifted to be applied to TX electrode 104(2), and so forth. Similar rotations can be applied to each subsequent stage of scanning. Such rotations can be referred to generally as circular rotations. The rotations can be generated by a sequencer (not illustrated in FIG. 1).

The given excitation sequence at each scanning stage can be used to construct an excitation matrix (H). The excitation matrix H can represent a pattern of excitation sequences to excite TX electrodes 104. A product of the excitation matrix and a finger response (x) (such as a direct response map of a finger or conductive object on a capacitive touch screen panel) (e.g., via matrix multiplication), returns a measured signal (s), such as for example, the sense signals measured by RX electrodes 106 and received by RX signal receiver 114. Thus, by multiplying an inverse ($H^{-1}$) of the excitation matrix with the measured signal (s) (e.g., via matrix multiplication), the finger response can be reconstructed. Additional details of this process will be described in more detail with respect to at least FIG. 6

In some embodiments, the rotations at each scanning stage can be shifts of numbers (or positions) other than one. For example, in some embodiments, the "0" that was applied to TX electrode 104(M) can be shifted to be applied to TX electrode 104(2), the "1" that was applied to TX electrode 104(1) can be shifted to be applied to TX electrode 104(3), and so forth. It should be noted that the number of shifts can be numbers other than one or two. In other embodiments, the sequencer can create different patterns for shifting. In such cases, the excitation matrix can be determined for example via machine learning algorithms.

Figure 2:
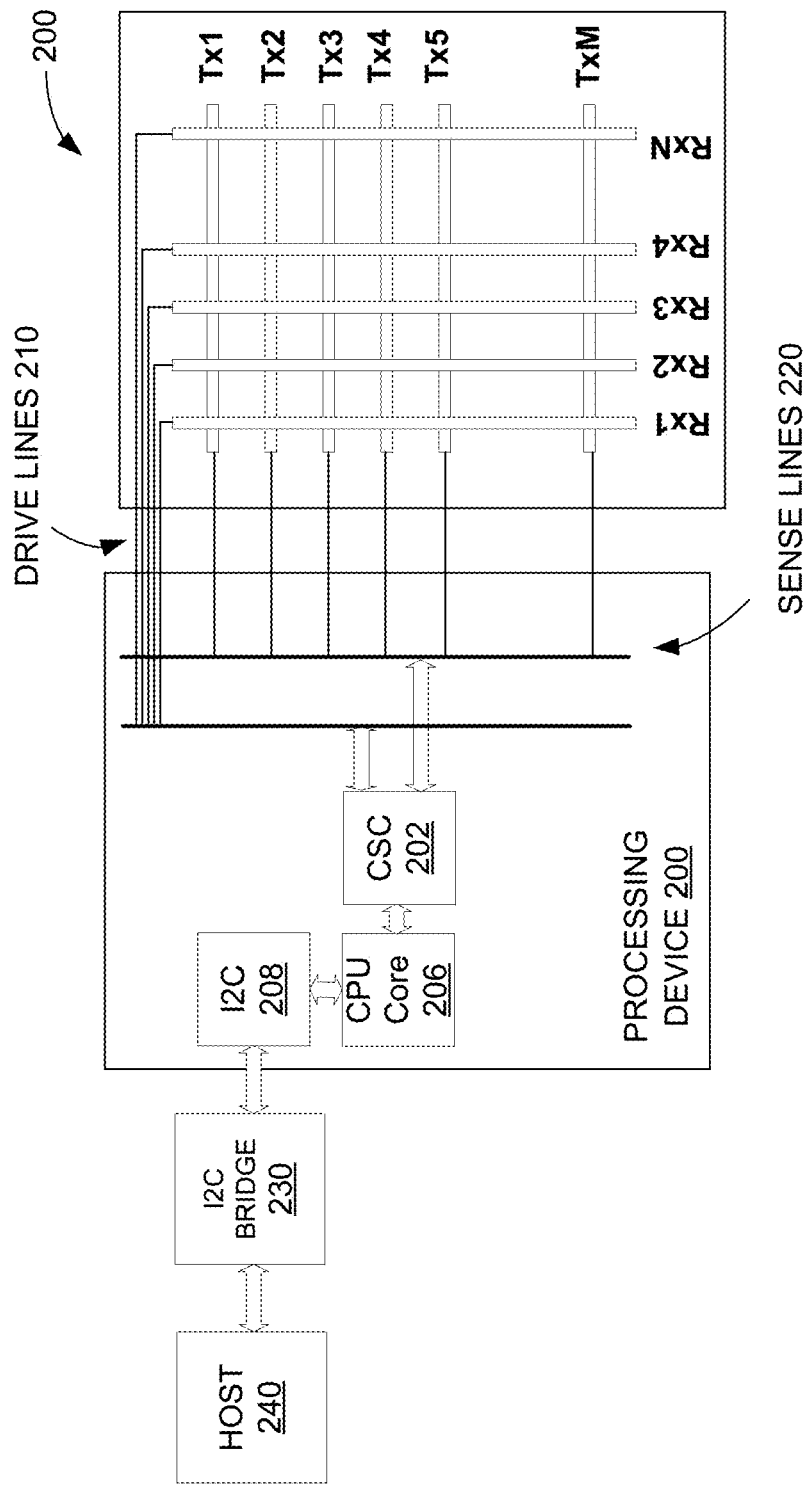
FIG. 2 is a block diagram of a processing device including capacitance-sensing circuitry (CSC) for measuring mutual capacitance or self-capacitance using multi-phase scanning according to one embodiment.

FIG. 2 is a block diagram of a processing device 200 including capacitance-sensing circuitry (CSC) 202 for measuring mutual capacitance or self-capacitance using multi-phase scanning according to one embodiment. Processing device 200 includes the capacitance-sensing circuitry 202, a CPU core 206, and one or more communication interfaces, for example, an I2C interface 208, which can communicate with a host processing device 240 over an I2C bridge 230. Alternatively, other types of communication interfaces may be used to communicate with host processing device 240. In other embodiments, capacitance-sensing circuitry 202 may be implemented in other types of processing devices that have similar or dissimilar components as processing device 200. In other embodiments, CPU core 206 can communicate with host processing device 240 using other communication devices and protocols than I2C as would be appreciated by those of ordinary skill in the art having the benefit of this disclosure. In some embodiments, processing device 200 does not communicate with host processing device 240 over I2C bridge 230, but may communicate with other peripheral devices, or even no other external devices.

In this embodiment, the capacitance-sensing circuitry 202 can measure mutual capacitances or self-capacitance of the sensor elements of capacitance-sensing device 100. As described above, the capacitance-sensing device 100 has M (row) TX electrodes 104 and N (column) RX electrodes 10. Each intersection of TX electrodes 104 and RX electrodes 106 represents a sensor element. The capacitance-sensing circuitry 202 can measure the mutual capacitances by applying multiple TX signals (e.g., the in-phase drive signal, the opposite-phase drive signal, or the reference signal) according to an excitation sequence on drive lines 210 and can receive sense signals on sense lines 220. The capacitance-sensing circuitry 202 may use the measured capacitances to detect a presence of an object, as well as the location of the object, motion, speed, and/or acceleration of the object. In one embodiment, the capacitance-sensing circuitry 202 can measure the mutual capacitances or self-capacitances and convert them into digital values. In one embodiment, the capacitance-sensing circuitry 202 is configured to detect a single touch and corresponding gestures using the digital values. In other embodiments, the capacitance-sensing circuitry 202 is configured to detect multiple touches and corresponding multi-touch gestures using the digital values.

In another embodiment, CPU core 206 can process the digital values received from the capacitance-sensing circuitry 202 to detect a presence of an object, movement of the objects, such as the object's speed, acceleration, and distance, as well as single and multi-touch gestures as would be appreciated by one of ordinary skill in the art having the benefit of this disclosure. CPU core 206 can also be used to receive raw data from the capacitance-sensing circuitry 202 and to convert the raw data into digital values, etc. In another embodiment, CPU core 206 can send the raw data to host processing device 240 for processing.

In one embodiment, host processing device 240 can represent a processing device of one or more machines, such as a desktop computer, a laptop computer, other types of portable computers, a mobile device, a set-top box (STB), a personal data assistant (PDA), a server, a network router, a switch or bridge. In one embodiment, processing device 200 is the PSoC® processing device offered by Cypress Semiconductor Corporation (San Jose, California), such as described with respect to FIG. 17. Alternatively, processing device 200 may be other types of processing devices as would be appreciated by those of ordinary skill in the art having the benefit of this disclosure. Alternatively, the capacitance-sensing circuitry 202 is integrated into host processing device 240. Further, while only a single machine is illustrated for host processing device 240, the term "machine" shall also be taken to include any collection of machines that individually or jointly execute a set (or multiple sets) of instructions to perform any one or more of the methodologies discussed herein. In other embodiments, an electronic system may include one or more host processing devices 240, processing devices 200, capacitance-sensing circuitry 202, as well as one or more peripheral devices.

Figure 3A:
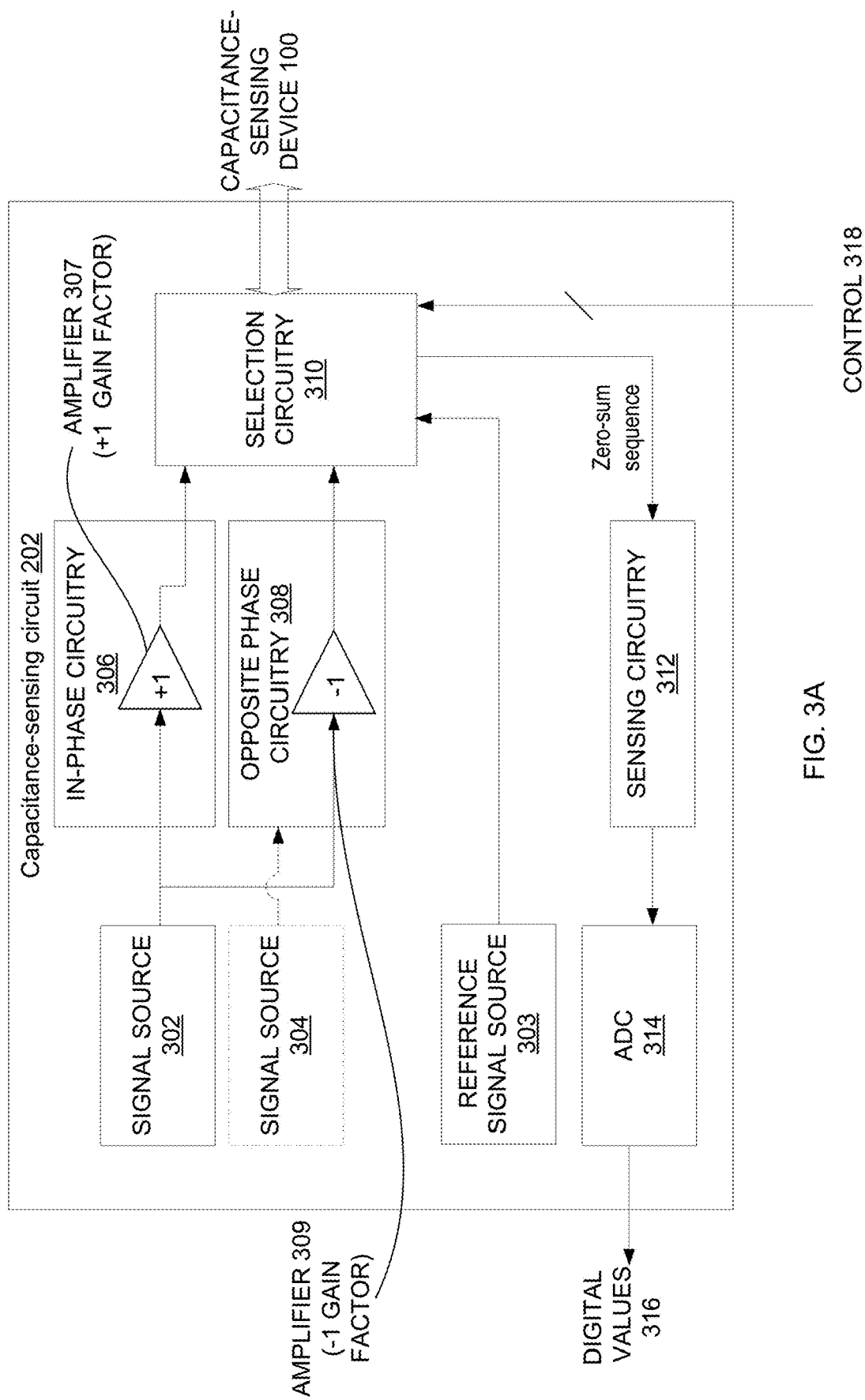
FIG. 3A is a block diagram of the capacitance-sensing circuitry of FIG. 2 according to one embodiment.

FIG. 3A is a block diagram of the capacitance-sensing circuitry 202 of FIG. 2 according to one embodiment. The capacitance-sensing circuitry 202 includes a first signal source 302, a second optional signal source 304, a reference signal source 303, in-phase circuitry 306, opposite phase circuitry 308, selection circuitry 310, sensing circuitry 312, and an analog-to-digital converter (ADC) 314. The in-phase circuitry 306 receives a signal from first signal source 302 and can generate an in-phase signal to be applied to one or more TX electrodes of the capacitance-sensing device 100. The opposite-phase circuitry 308 may receive the same signal from signal source 302 and generate an opposite phase signal to be applied to one or more TX electrodes of the capacitance-sensing device 100. Reference signal source 303 may be from a ground potential or other voltage potential.

The capacitance-sensing circuitry 202 may be implemented in the analog domain or digital domain. In one embodiment, the in-phase circuitry 306 is an analog circuit having an amplifier 307 with a +1 gain factor. Amplifier 307 may be used to create an in-phase signal. In this embodiment, the opposite phase circuitry 308 is also an analog circuit having an amplifier 309 with a −1 gain factor. Amplifier 309 is used to create the opposite phase signal. In another embodiment, optional signal source 304 can be used to generate a second signal that is already out of phase of the first signal. In this embodiment, the opposite phase circuitry 308 may not use an amplifier having a −1 gain factor. Alternatively, more than two signal sources can be used to generate multiple signals, including at least the in-phase signal, one or more opposite phase signals, and reference signals. In these embodiments, signal sources 302 and 304 generate analog signals to be received by the in-phase circuitry 306 and the opposite phase circuitry 308. Signal sources 302 and 304 may be passive components that generate one or more carrier signals, having one or more frequencies. In other embodiments, signal sources 302 and 304 may be components that are controlled externally, for example, by CPU core 206 of processing device 200. It should also be noted that the in-phase circuitry 306 may not include an amplifier, but could use other analog circuits to generate the in-phase signal as would be appreciated by one of ordinary skill in the art having the benefit of this disclosure.

In another embodiment, the in-phase circuitry 306 can include digital circuitry or digital processing logic configured to receive the first signal from signal source 302 and to generate the in-phase signal, for example, using a digital buffer, or the like. In this embodiment, the opposite phase circuitry 308 includes an inverter that receives the same signal from the signal source 302, and inverts the signal to generate the opposite phase signal. In another embodiment, the second optional signal source 304 may be used to generate a second signal that can be used for the opposite phase signal as described above. In these embodiments, signal sources 302 and 304 generate digital signals to be received by the in-phase circuitry 306 and the opposite phase circuitry 308. For example, signal source 302 can generate a digital sequence (e.g., pseudorandom sequence) to be applied to the in-phase circuitry 306 and the opposite phase circuitry 308. Alternatively, signal source 302 can provide a modulated digital signal. In another embodiment, signal sources 302 and 304 generate analog signals, and the in-phase circuitry 306 and the opposite phase circuitry 308 include analog-to-digital converters that convert the analog signals into digital signals. Like above, signal sources 302 and 304 may be passive components that generate one or more carrier signals, having one or more frequencies. In other embodiments, signal sources 302 and 304 may be components that are controlled externally, for example, by CPU core 206 of processing device 200.

In the depicted embodiment, the selection circuitry 310 receives the in-phase signal and the opposite phase signal and applies the appropriate signal to the TX electrodes of the capacitance-sensing device 100. The selection circuitry 310 can be controlled externally, for example, one or more control signals 318 received from CPU core 206. For example, a phase modulation function selection routine can be run on CPU core 206 and the routine controls the selection circuitry 310 using the control signals 318. Alternatively, the selection circuitry 310 can be used to control which TX electrodes receive the in-phase signal, which TX electrodes receive the opposite-phase signals, and which TX electrodes receive the reference signals. In the depicted embodiment, there are three signals: one in-phase signal, one opposite-phase signal, and one reference signal. In other embodiments, there may be more than two signals: one in-phase signal, multiple opposite phase signals, and one or more reference signals. The reference signal (0) may be interpreted as both nodes of a capacitor (e.g., sensor) having the same potential, and thus no current flows into an RX channel for measurement. This can be in opposition to when current flows through the capacitor and into the RX channel, as would be the case for a measured in-phase or opposite phase signal (+1 or −1 respectively).

In one embodiment, the selection circuitry 310 includes one or more multiplexers that can be controlled to select the appropriate signal for the appropriate TX electrodes. In one embodiment, the selection circuitry 310 is configured to select alternating ones of the TX electrodes to receive the in-phase signal, and the other alternating ones of the TX electrodes to receive the opposite phase signal. Alternatively, the selection circuitry 310 can drive the TX electrodes in other patterns (e.g., excitation sequences) as described herein, as well as in other patterns as would be appreciated by one of ordinary skill in the art having the benefit of this disclosure.

In the depicted embodiment, the selection circuitry 310 is also coupled to the sensing circuitry 312. The sensing circuitry 312 is configured to receive sense signals from the RX electrodes of the capacitance-sensing device 100. The sense signals result from zero-sum excitation sequences. The sense signals represent the mutual capacitances or self-capacitances at the respective intersections of the panel electrodes. In one embodiment, the sensing circuitry 312 includes analog circuits, digital circuitry, or digital processing logic that is configured to measure the capacitance. For example, in one embodiment, the sensing circuitry 312 includes analog circuitry to measure the current associated with each of the RX electrodes. The sensing circuitry 312 provides the measured values to the ADC 312 to be converted to the digital values 316. The capacitance-sensing circuitry 202 provides the digital values to CPU core 206 or the host processing device 240 as described above.

In one embodiment, the capacitance-sensing circuitry 202 is configured to drive TX electrodes 104 using a phase modulation function selection. For example, coefficients of a phase matrix (F) (also referred to as an excitation matrix (H)) could be selected in multiple ways to form the non-singular matrix. There are several criteria that can be used for the phase modulation function selection: 1) The matrix should be a well-defined matrix for getting a stable linear solution set; 2) The matrix coefficients determine the filter properties of the system, so matrix could be selected in such way to get best filtering properties. 3) The receiver input current at "no touch" may be minimized. 4) It can be desirable to have a close to constant receiver current for the different scanning stages if the receiver has a limited dynamic range.

Figure 3B:
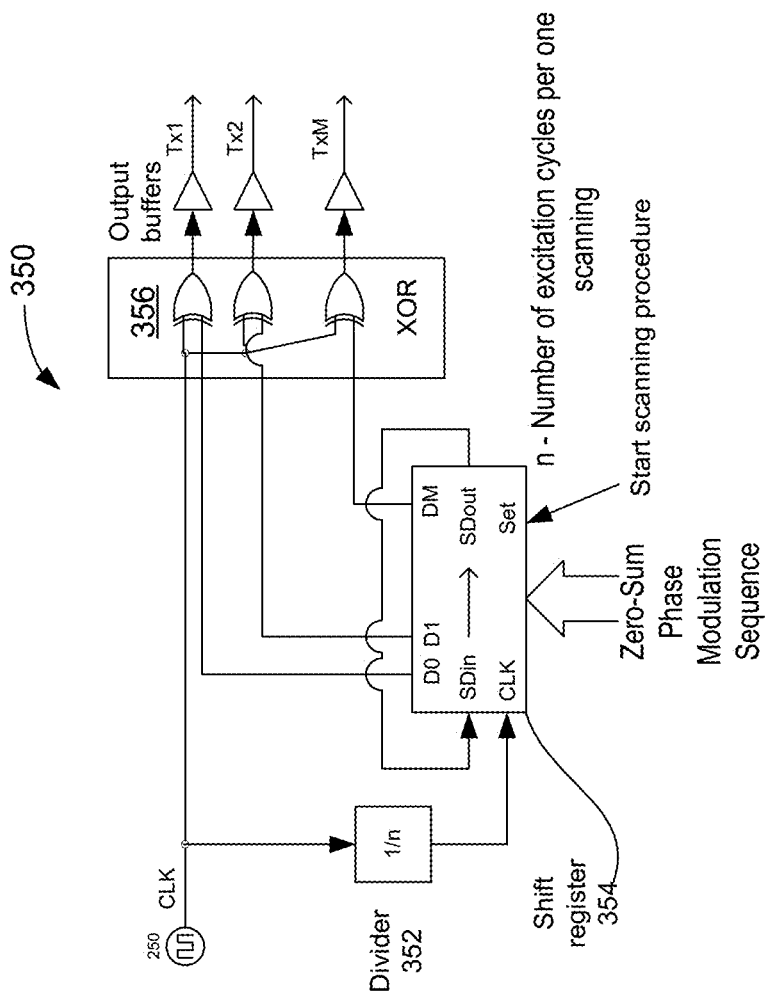
FIG. 3B is a block diagram of sequence generation circuitry according to one embodiment.

FIG. 3B is a block diagram of sequence generation circuitry 350 according to one embodiment. The sequence generation circuitry 350 includes a programmable divider 352, a shift register 354, and an array of the XOR gates 356, which are used for the binary phase change of the TX signals. At the initialization phase, the sequence (e.g., the excitation sequence) is loaded in the shift register 354. For each n cycles, a clock pulse for the shift register 354 is generated, which shifts the sequence on the outputs. Each register output is connected to the second XOR gate input. A common clock signal is applied to the first XOR gate input. Depending on the register output state, the XOR gate passes the clock signal with inversion or without inversion, forming different multi-phase output signals.

There are multiple ways for the phase matrix filling. In one embodiment, the selecting function uses a pseudorandom sequence of the +1, −1 and rotating this sequence during the multiple scanning stages for the complete matrix filling. In some embodiments, the sequence can be selected such that the sum is zero. In this embodiment, included here for exemplary purposes, the sequence has a sum of −2. For example, if we select the following sequence, for M=10:

$$\overline{F_V}=[-1,+1,-1,-1,+1,+1,-1,-1,-1,+1] \tag{1}$$

The full matrix F could be filled by the cyclic rotation of the $F_V$ sequence:

$$F = \begin{pmatrix} -1 & 1 & -1 & -1 & 1 & 1 & -1 & -1 & -1 & 1 \\ 1 & -1 & 1 & -1 & -1 & 1 & 1 & -1 & -1 & -1 \\ -1 & 1 & -1 & 1 & -1 & -1 & 1 & 1 & -1 & -1 \\ -1 & -1 & 1 & -1 & 1 & -1 & -1 & 1 & 1 & -1 \\ -1 & -1 & -1 & 1 & -1 & 1 & -1 & -1 & 1 & 1 \\ 1 & -1 & -1 & -1 & 1 & -1 & 1 & -1 & -1 & 1 \\ 1 & 1 & -1 & -1 & -1 & 1 & -1 & 1 & -1 & -1 \\ -1 & 1 & 1 & -1 & -1 & -1 & 1 & -1 & 1 & -1 \\ -1 & -1 & 1 & 1 & -1 & -1 & -1 & 1 & -1 & 1 \\ 1 & -1 & -1 & 1 & 1 & -1 & -1 & -1 & 1 & -1 \end{pmatrix} \tag{2}$$

The inverse matrix looks as follows:

$$F^{-1} = \begin{pmatrix} -0.1932 & -0.0795 & -0.2386 & -0.2159 & -0.1477 & 0.0568 & 0.1705 & 0.0114 & 0.0341 & 0.1023 \\ 0.1023 & -0.1932 & -0.0759 & -0.2386 & -0.2159 & -0.1477 & 0.0568 & 0.1705 & 0.0144 & 0.0341 \\ 0.0341 & 0.1023 & -0.1932 & -0.0795 & -0.2386 & -0.2159 & -0.1477 & 0.0568 & 0.1705 & 0.0114 \\ 0.0114 & 0.0341 & 0.1023 & -0.1932 & -0.0795 & -0.2386 & -0.2159 & -0.1477 & 0.0568 & 0.1705 \\ 0.1705 & 0.0114 & 0.0341 & 0.1023 & -0.1932 & -0.0795 & -0.2386 & -0.2159 & -0.1477 & 0.0568 \\ 0.0568 & 0.1705 & 0.0114 & 0.0341 & 0.1023 & -0.1932 & -0.0795 & -0.2386 & -0.2159 & -0.1477 \\ -0.1477 & 0.0568 & 0.1705 & 0.0114 & 0.0341 & 0.1023 & -0.1932 & -0.0795 & -0.2386 & -0.2159 \\ -0.2159 & -0.1477 & 0.0568 & 0.1705 & 0.0114 & 0.0341 & 0.1032 & -0.1932 & -0.0795 & -0.2386 \\ -0.2386 & -0.2159 & -0.1477 & 0.0568 & 0.1705 & 0.0114 & 0.0341 & 0.1023 & -0.1932 & -0.0795 \\ -0.0795 & -0.2386 & -0.2159 & -0.1477 & 0.0568 & 0.1705 & 0.0114 & 0.0341 & 0.1023 & -0.1932 \end{pmatrix} \quad (3)$$

By looking at the inverse matrix of Equation (3), one can see interesting properties of the inverse matrix, formed by the cyclic rotation of the sequence of Equation (1). For example, the inverse matrix coefficients are obtained by the cyclic rotation of the one matrix row or column, requiring the minimum read-only memory (ROM) area for storage. This matrix could be normalized to be implemented on the integer computation by the CPU core 206, or by the host processing device 240. It should be noted that in the case that the sum of the $F_V$ sequence is zero, the matrix F is singular and cannot be directly inverted. However, a pseudo-inversion of F can be obtained, as described herein.

The $F_V$ can be selected in such a way that the different operation phases can easily be distinguished. Using a phase modulation sequence is close to the pseudorandom process and cyclic process time shift allows obtaining the phase modulation sequences, which have minimum cross-correlation functions and provide a stable solution of the linear Equation (1). Therefore, the cross-correlation coefficient between different phase modulation sequences should be much smaller than the autocorrelation function peak. When using cyclic phase modulation sequence rotation, this sequence autocorrelation function should have minimum side peaks and a large signal peak.

Figure 4A:
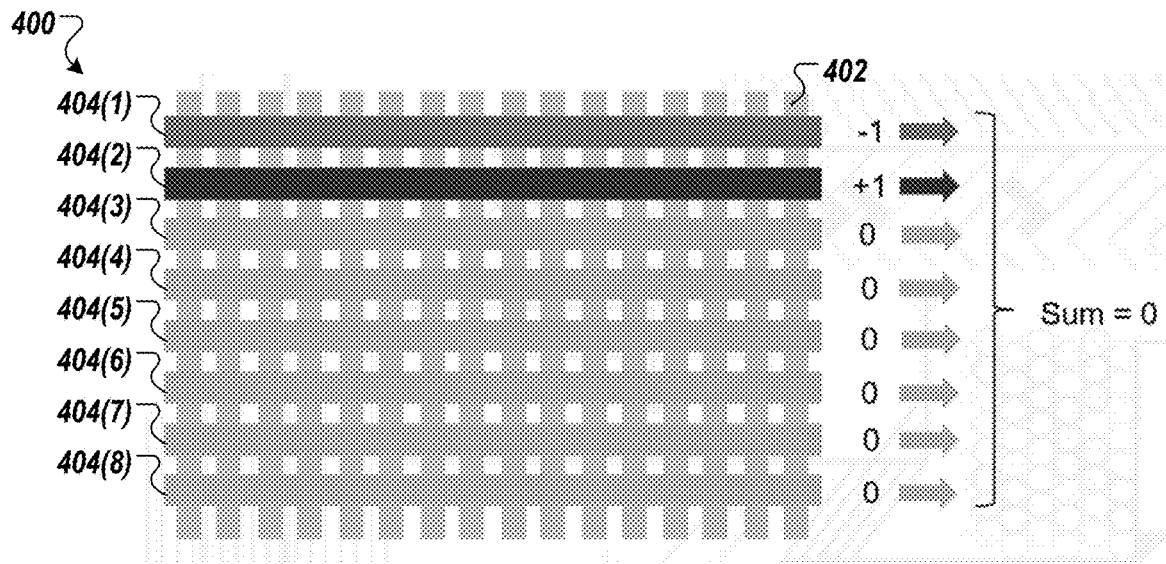
FIGS. 4A-4B are schematic diagrams of a sensing grid of a capacitance-sensing device according to one embodiment.
Figure 4B:
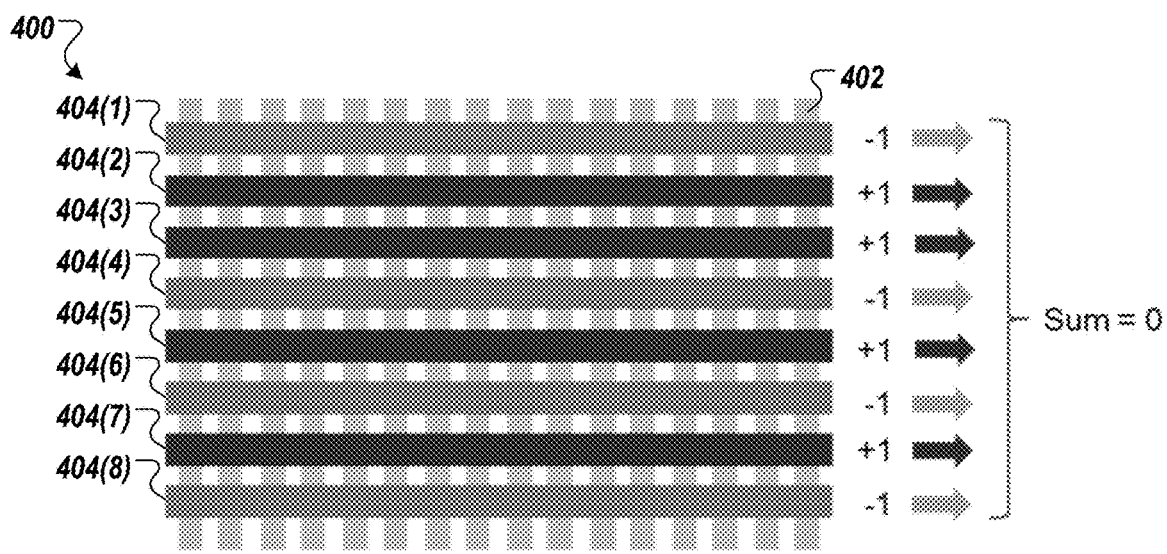

FIGS. 4A-4B are schematic diagrams of a sensing grid 402 of a capacitance-sensing device 400 according to one embodiment. Sensing grid 402 and capacitance-sensing device 400 may be the same as or similar to sensing grid 102 and capacitance-sensing device 100 of FIG. 1. As depicted, capacitance-sensing device 400 has eight TX electrodes 404(1)-404(8). Each TX electrode 404 can have a value of positive one, negative one, or zero corresponding to an in-phase drive signal, an opposite-phase drive signal, or a reference signal respectively according to the given excitation sequence. An excitation sequence can refer to the values sequentially assigned to each TX electrode. For example in FIG. 4A, the excitation sequence is {−1, +1, 0, 0, 0, 0, 0, 0}, while in FIG. 4B, the excitation sequence is {−1, +1, +1, −1, +1, −1, +1, −1}. In both cases, the sum of the excitation sequence is zero.

In order to minimize electromagnetic emission, TX electrodes (such as 104 and 404) should be excited such that the sum of the excitation sequence is zero. In open space, each TX electrode of a capacitive-sensing touch panel can emit an electromagnetic wave with the same power. Therefore exciting the TX electrodes in such a way that the in-phase drive signal excitations cancel the opposite-phase drive signal excitations can result in a minimal electromagnetic emission. In some embodiments, the electromagnetic emission can be proportional to an absolute value of the sum of the excitation sequence, and is therefore minimal when the sum of the excitation sequence is zero. It should be noted that achieving a vanishing sum of the excitation sequence can be done with a combination of positive ones, negative ones, and zeros, as in FIG. 4A, or with a combination of just positive ones and negative ones, as in FIG. 4B. The specific sequence that is used can affect SNR and radiated emission in some cases. It should also be noted that a capacitance-sensing device can have an integer value of TX electrodes and any appropriate combination of positive ones, negative ones, and zeros can be used in the excitation sequence. Specifically, in some cases, the capacitance-sensing device may have an odd number of TX electrodes and still have an excitation sequence with a sum of zero.

In some embodiments, due to specific hardware configurations and location of ground (e.g., a ground potential or a reference potential), for example in consumer electronic devices or automotive applications, the electromagnetic emission may not be identical for each TX electrode. This can result in cases in which the electromagnetic emission is not exactly zero even when the sum of the excitation sequence is zero. In some embodiments, an optimal excitation sequence depends on the hardware configuration and the location of the specific TX electrode in relation to ground. Specifically for automotive applications, ground is often located under sensors that are close to the bottom TX electrodes. In such cases, an optimal configuration for reducing electromagnetic emissions may have the two top electrodes excited with an in-phase drive signal (e.g., positive one) and three bottom electrodes excited with an opposite-phase drive signal (e.g., negative one).

In automotive applications, there can be a small electromagnetic emission gradient between top TX electrodes and bottom TX electrodes. For example in a first scanning stage, neighboring TX electrodes may emit substantially the same electromagnetic power, but not exactly the same electromagnetic power. This can lead to a small electromagnetic emission gradient between neighboring TX electrodes, which can lead to very low electromagnetic emissions during differential scanning (e.g., scanning of two electrodes). However, at another scanning stage, when the excitation sequence has been cyclically rotated, in some cases a top TX electrode (excited by an in-phase drive signal) may be scanned differentially with a bottom TX electrode (excited by an opposite-phase drive signal), which can lead to a large electromagnetic emission gradient, and thus a strong electromagnetic emission. In such cases, some scans, in particular those with large gradients, may be omitted to minimize the electromagnetic emission.

Figure 5B:
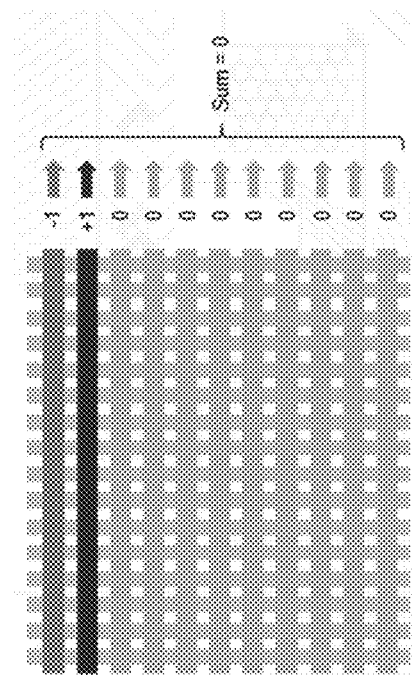
FIGS. 5A-5B are comparisons of electromagnetic emission for capacitance-sensing devices with excitation sequence sums of one and zero respectively and according to embodiments.
Figure 5B:
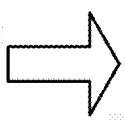
Figure 5B:
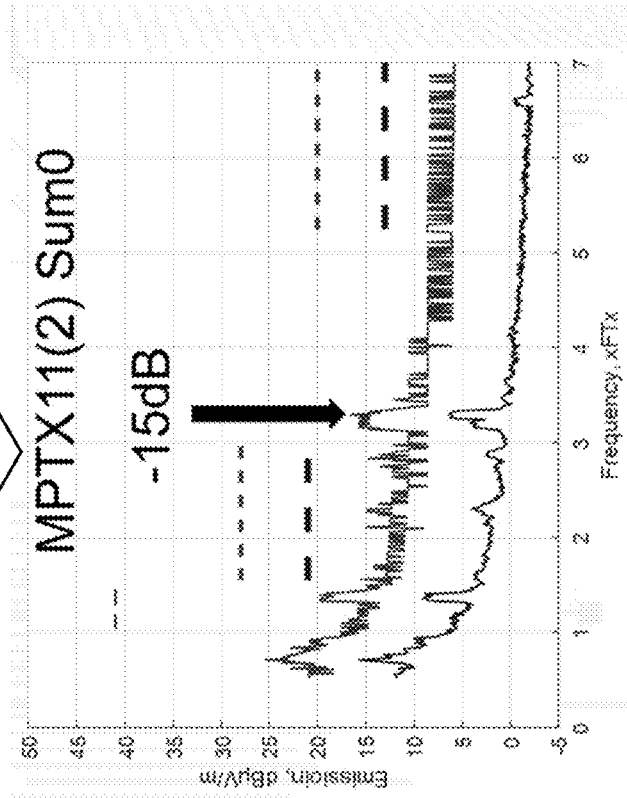
Figure 5A:
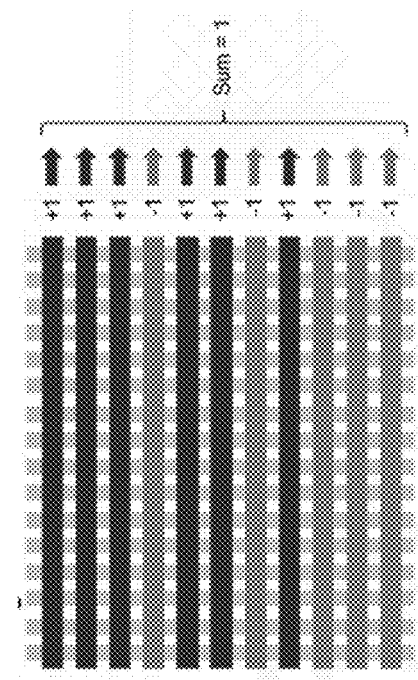
Figure 5A:
Figure 5A:
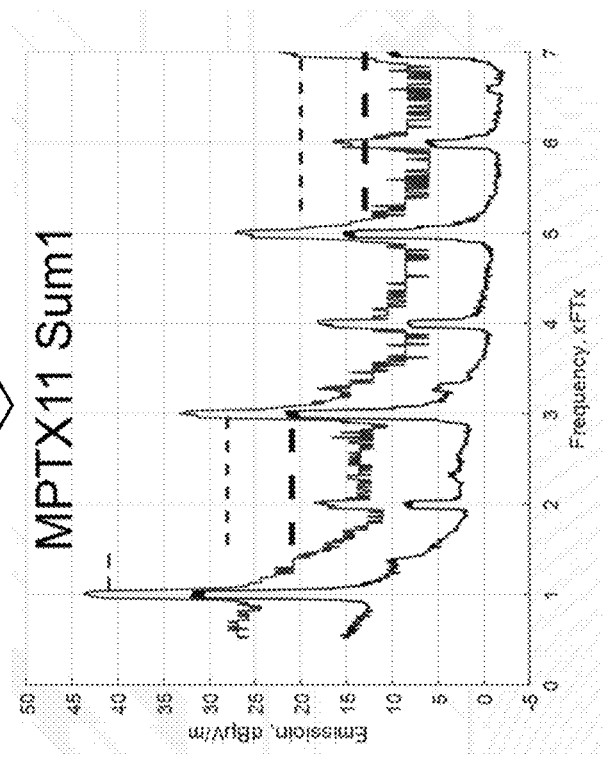

Other applications may have different hardware configurations and ground locations, thus performing a scan over all TX electrodes (with an excitation sequence with a sum of 0) may help mitigate large electromagnetic emission gradients to minimize electromagnetic emission. Similarly, some scans may be omitted to further decrease electromagnetic emission. Partial scanning (e.g., scanning of only some TX electrodes) and specific TX electrode excitation (e.g., exciting only some TX electrodes) can lead to ambiguity, as described further herein FIGS. 5A-5B are comparisons of electromagnetic emission for capacitance-sensing devices with excitation sequence sums of one and zero respectively and according to embodiments. FIG. 5A shows a capacitance-sensing device with an excitation sequence of {+1, +1, +1, −1, +1, +1, −1, +1, −1, −1, −1}, and a sum of +1. As shown by the graph, the electromagnetic emission of the capacitance-sensing device exceeds the required limitation for automotive applications. FIG. 5B shows a capacitance-sensing device, such as capacitance-sensing device 400 of FIG. 4, with an excitation sequence of {−1, +1, 0, 0, 0, 0, 0, 0, 0, 0} as in FIG. 4A, and a sum of 0. As shown by the graph, the electromagnetic emission of the capacitance-sensing device is within the required limits for automotive applications.

Figure 6:
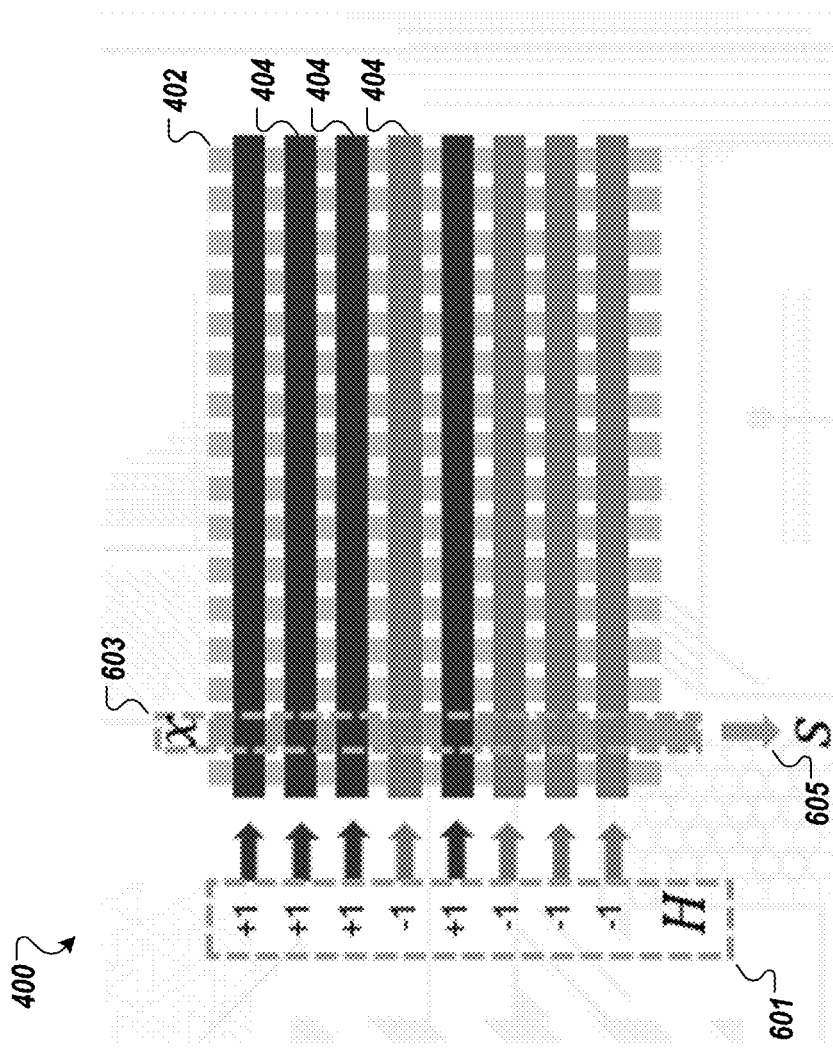
FIG. 6 is a schematic diagram of a sensing grid of a capacitance-sensing device of FIG. 4 according to one embodiment.

FIG. 6 is a schematic diagram of sensing grid 402 of capacitance-sensing device 400 of FIG. 4 according to one embodiment. FIG. 6 includes designations of an excitation matrix (H) 601, a finger response (x) 603, and a measured signal (s) 605. As an illustrative example, the excitation sequence illustrated in FIG. 6 is {+1, +1, +1, −1, +1, −1, −1, −1}, which corresponds to applying the drive signals to TX electrodes 404 at a first scanning stage. For each subsequent scanning stage, the excitation sequence can be rotated in a cyclical manner until each rotation results in the initial sequence. Each subsequent scanning stage can add an additional column to the excitation matrix H, such that the excitation matrix is a matrix with dimensions L×M, where M is the number of TX electrodes, and L is the number of rotations. In some embodiments L may be the same as M, resulting in a square matrix, however, in other embodiments, L can be different than M, resulting in a non-square matrix. The excitation matrix H can be representative of an excitation pattern of drive signals (in-phase drive signals, opposite-phase drive signals, and reference signals) to excite the TX electrodes. The finger response x can be a matrix corresponding to a map of electrodes where some electrodes may receive a signal from a touch, for example when a user's finger interacts with a capacitance-sensing touch panel. The finger response x can have a dimension of M×N where N corresponds to the number of RX electrodes that receive a sense signal corresponding to the touch. The measured signal s can be a matrix corresponding to measured sense signals, e.g., as measured by scanning RX electrodes. The measured signal s can have a dimension of L×N. The measured signal s is a result of multiplying the excitation matrix H by the finger response x:

$$H \cdot x = s. \quad (4)$$

For capacitance-sensing devices, the finger response x should be determined so that a user can interact with a capacitance-sensing touch panel. The excitation matrix H can be predetermined or pre-calculated, and thus is known. Further, when a user interacts with the capacitance-sensing touch panel, a sense signal can be measured (e.g., the measured signal s is known). By inversion, the finger response x can be determined as $$x = H^{-1} \cdot s. \quad (5)$$

In some embodiments, when the sum of the excitation sequence is not zero (e.g., 1 or 2), the excitation matrix H can be inverted and the finger touch x can be reconstructed. However, this case can lead to higher electromagnetic emissions. The pseudoinverse matrix $H^{-1}$ can have dimensions of M×L.

When the sum of the excitation sequence is zero, the electromagnetic emission may be lower, but the excitation matrix His singular (e.g., has an infinite number of roots), and thus cannot be inverted. In such cases, Equation (5) can be narrowed down to partial solutions and can be solved when touches are present (and not when no touches are present or when all of the sensors are covered) by finding an appropriate pseudoinverse of the excitation matrix. In one embodiment, the pseudoinverse is the Moore-Penrose pseudoinverse. In other embodiments, the pseudoinverse can be one of a one-sided inverse (right or left inverse), a Bott-Duffin inverse, a Drazing inverse, or a reflexive generalized inverse.

In order to find a location of a touch, an analytical ambiguity reduction method (process) can be applied. One potential drawback of the analytical ambiguity reduction method is that a common-mode level can be lost. However, by scanning one or more regions where each sequential scanning stage includes at least one common TX electrode, the common-mode level can be aligned to form a baseline. The analytical ambiguity reduction method is described with respect to FIG. 7 below.

Figure 7:
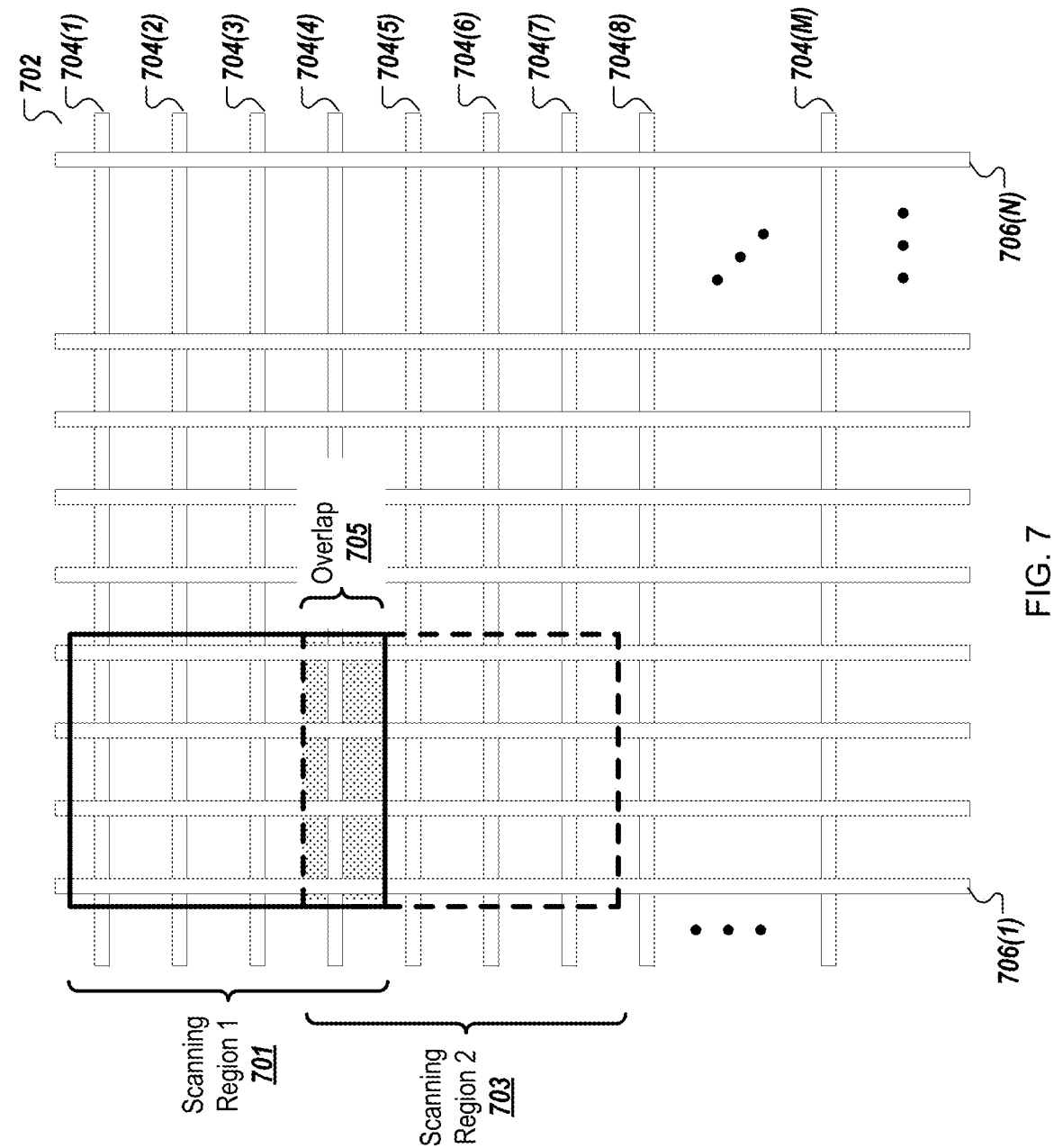
FIG. 7 is a schematic diagram of a sensing grid of a capacitance-sensing device with a first scanning region, a second scanning region, and an overlap region according to one embodiment.

FIG. 7 is a schematic diagram of sensing grid 702 of capacitance-sensing device 700 with a first scanning region 701, a second scanning region 703, and an overlap region 705 according to one embodiment. The sensing grid 702 and the capacitance-sensing device 700 may be similar to the sensing grids 102, 402, 702, and 802 and capacitance-sensing devices 100, 400, 700, and 800 of FIGS. 1,4, and 7-8. Overlap region 705 represents a region where one or more TX electrodes are included in both a first scan during a first scanning stage and a second scan during a second scanning stage.

In one case (not depicted in FIG. 7), a first scanning stage and a second scanning stage do not include a common electrode (e.g., an overlap of a TX electrode in the first scanning stage and the second scanning stage). For example, at the first scanning stage, TX electrodes 704(1)-704(4) can be simultaneously excited by an in-phase drive signal, an opposite-phase drive signal, or a reference signal according to a zero-sum excitation sequence. At the second scanning stage, TX electrodes 704(5)-704(8) can be simultaneously excited by the in-phase drive signal, the opposite-phase drive signal, or the reference signal according to a rotated zero-sum excitation sequence. Subsequent scanning stages can be excited by the in-phase drive signal, the opposite-phase drive signal, or the reference signal according to further rotations of the zero-sum excitation sequence. In this case, the common-mode level corresponding to a baseline over multiple scanning stages can be lost, due to the excitation matrix H being singular, which leads to a discontinuous baseline.

In order to recover a common-mode level and a continuous baseline, the first scanning stage and the second scanning stage should include at least one common TX electrode (e.g., an overlap of a TX electrode in both the first scanning stage and the second scanning stage). For example, at a first scanning stage, a first scan can be made which includes first scanning region 701. First scanning region 701 includes a first set of TX electrodes 704(1)-704(4). At a second scanning stage after (or sequential to) the first scanning stage, a second scan can be made which includes second scanning region 703. Second scanning region 703 includes a second set of TX electrodes 704(4)-704(7). The first set of TX electrodes and the second set of TX electrodes have a common TX electrode 704(4) in overlap region 705. In some embodiments overlap region 705 includes a single common TX electrode. In some other embodiments, overlap region 705 may include two or more common TX electrodes. Further, although scanning regions 701 and 704 are depicted in FIG. 7 as including four TX electrodes, in other embodiments, scanning regions can include less than four or more than four TX electrodes. Such methods of overlapped scanning can be used to align a common-mode level to form a continuous baseline, as described in more detail with respect to FIG. 8

Figure 8:
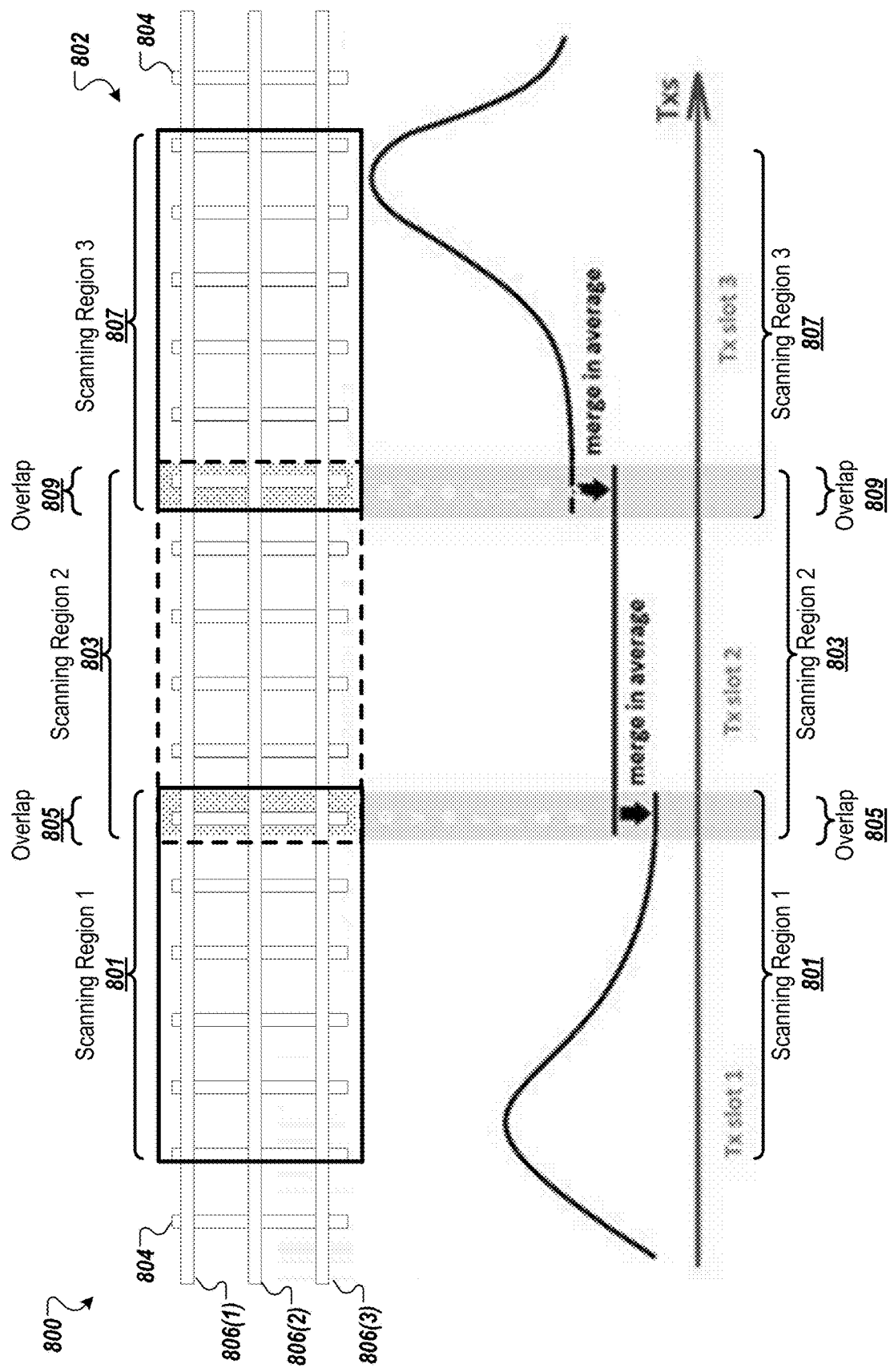
FIG. 8 is a graph illustrating baseline correction over TX electrode scanning regions of a sensing grid of a capacitance-sensing device 800 according to one embodiment.

FIG. 8 is a graph illustrating baseline correction over TX electrode scanning regions of a sensing grid 802 of a capacitance-sensing device 800 according to one embodiment. The sensing grid 802 and the capacitance-sensing device 800 may be similar to the sensing grids 102, 402, and 702 and capacitance-sensing devices 100, 400, and 700 of FIGS. 1-7.

As depicted in FIG. 8, a first scan including a first scanning region 801 includes a first set of TX electrodes 804. A first sense signal resulting from the first scan can have a first common-mode level. A second scan, performed sequentially to the first scan includes a second scanning region 803 which includes a second set of TX electrodes 804. A second sense signal resulting from the second scan can have a second common-mode level that is different than the first common-mode level. In one embodiment, a first common-mode level can be taken as a reference for a baseline. In other words, a common-mode level measured on the TX electrode overlap 805 by RX electrodes 806(1)-806(3) may be s1={s11, s12, s13}, respectively. The second-common mode level measured on the TX electrode overlap 805 by RX electrodes 806(1)-806(3) may be s2={s21, s22, s23}, respectively. A difference value can be determined between the first common-mode level and the second common-mode level as ds12=s1−s2={s11−s21, s12−s22, s13−s23}. The difference value ds12 can be added to the second common-mode level, s2+ds12={s21, s22, s23}+{s11−s21, s12− s22, s13− s23}={s11, s12, s13} and applied to the data obtained from the measurement of the second scanning region 803 (e.g., TX slot 2) to achieve a shifted second common-mode level that is equal to the first common-mode level, thus establishing a continuous baseline between the first scanning stage and the second scanning stage. Similar operations may be performed on subsequent scanning stages to achieve a single common-mode level for each scanning stage. In another embodiment, rather than adding the difference value to the second common-mode level, the difference value may be subtracted from the first common-mode level. In another embodiment, the first common-mode level and the second common-mode level may be averaged in order to achieve a single common-mode level among each scanning stage, and thus a continuous baseline.

Figure 9:
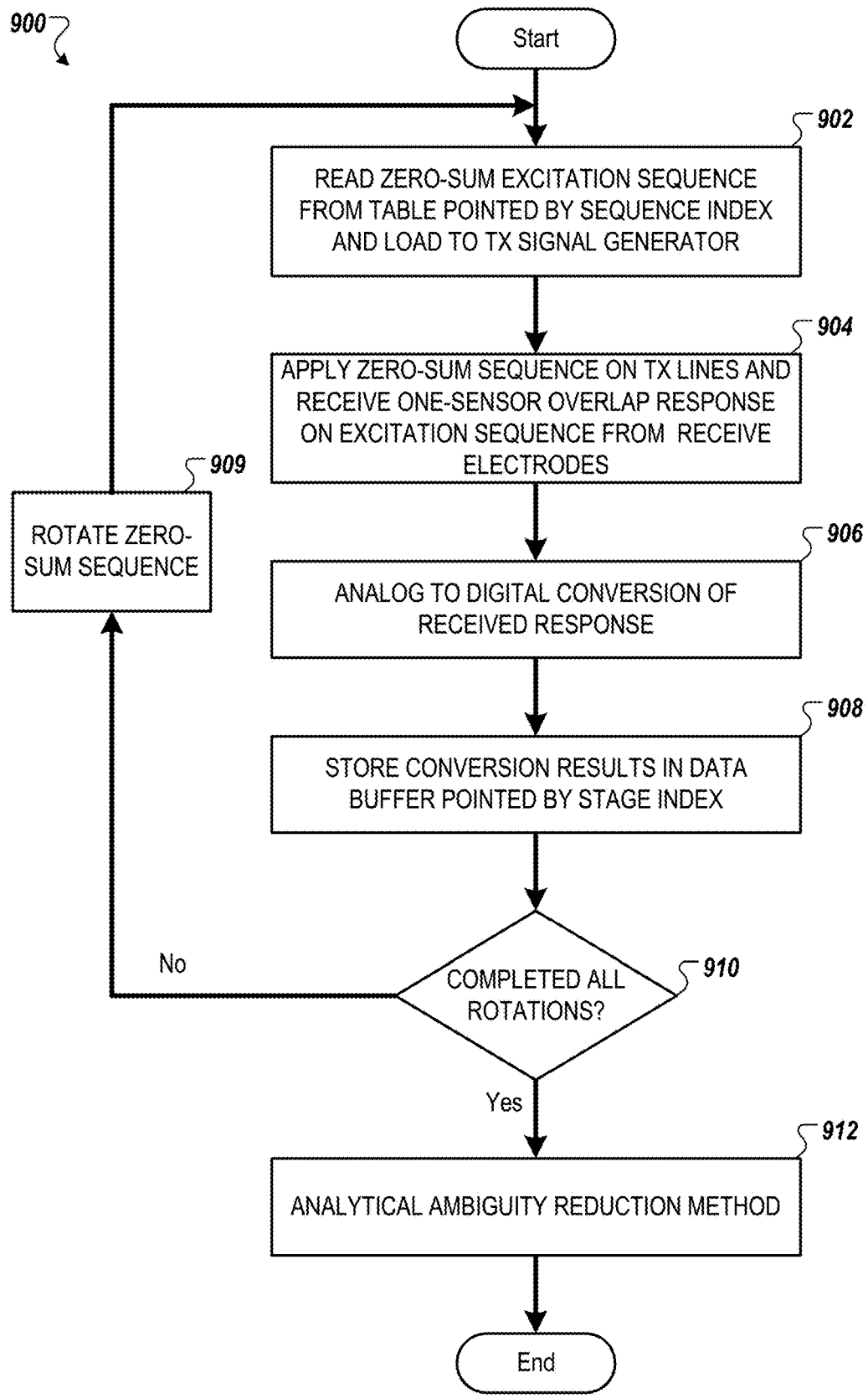
FIG. 9 is a flow diagram of one embodiment of a method for multi-phase scanning.

FIG. 9 is a flow diagram of one embodiment of a method for multi-phase scanning. In some embodiments, processing logic may be used to perform the method 900. The processing logic may include hardware, software, or any combination thereof. In one embodiment, the processing device 200 of FIG. 2 performs the method 900. In another embodiment, the capacitance-sensing circuitry 202 of FIG. 2 performs the method 900. Alternatively, other components may be used to perform some or all of the operations of the method 900. At block 902, the processing logic reads zero-sum excitation sequence for the TX line signals from a table and loads signal generation parameters to TX signal generators. At block 904, processing logic applies zero-sum TX signal sequences to TX electrodes and senses one-sensor overlap responses from receive electrodes at the substantially same time. At block 906, processing logic performs analog to digital conversion of received responses once the conversion stage is complete. The conversion results are stored in a data buffer (block 908). The status of rotations is checked in block 910. Once all rotations of the zero-sum excitation sequence are complete, excitation matrix H can be determined. Because the excitation sequence has a sum of zero, the excitation matrix H is singular. In this case, an analytical ambiguity reduction method (process) is initiated in block 912; the method 900 ends. The analytical ambiguity reduction method will be described further with respect to FIG. 10. In the opposite case, the excitation sequence is rotated in block 909 and blocks 902-910 are executed again.

It should be noted that modifications of the execution flow may be made in other embodiments of the present invention embodiments. For example, some invention embodiments could execute blocks 902 and 904 in parallel by using multiple analog-to-digital conversion channels. There are possible different organizations of the deconvolution procedure. Taking into account that the analytical ambiguity reduction method may take multiple iterations, it could be reorganized on multiple steps and each step can be executed once the result of the individual conversion stage is available. This implementation gives benefits in overall execution time, as the analytical ambiguity reduction method could be executed in parallel with scanning.

In one embodiment, the processing logic generates an in-phase drive signal and an opposite-phase drive signal. The processing logic selects a zero-sum excitation sequence having a number of positive one values, negative one values, and zero values corresponding to the in-phase drive signal, the opposite-phase drive signal, and a reference signal respectively. The reference signal is from a voltage potential or a ground potential. The zero-sum excitation sequence has a sum that is equal to zero. The processing logic applies one of the in-phase drive signal, the opposite-phase drive signal, or the reference signal to each of a first set of TX electrodes at substantially the same time (e.g., simultaneously) and according to the zero-sum excitation sequence during a first scanning stage out of a set number of scanning stages. The processing logic rotates the zero-sum excitation sequence to obtain a rotated zero-sum excitation sequence. The processing logic applies one of the in-phase drive signal, the opposite-phase drive signal, or the reference signal to each of a second set of TX electrodes at substantially the same time (e.g., simultaneously) and according to the rotated zero-sum excitation sequence during a second scanning stage out of a set number of scanning stages. The processing logic receives sense signals from a set of RX electrodes to detect a presence of an object on a touch panel. The sense signals represent capacitances associated with the set of RX electrodes.

In one embodiment, the TX electrodes and the RX electrodes are the same electrodes. In that case, the sense signals represent the self-capacitances of the set of RX electrodes. In another embodiment, the TX electrodes and the RX electrodes are different electrodes. In that case, the sense signals represent mutual capacitances of intersections of the TX electrodes and the RX electrodes.

In some embodiments, there is an odd number of TX electrodes, and the zero-sum excitation sequence includes one or more positive one values, one or more negative one values, and one or more zero values, and the sum of the zero-sum excitation sequence vanishes (e.g., equals to zero).

In one embodiment, the processing logic uses binary phase modulation to perform the method in which the processing logic receives or generates a carrier signal as the in-phase drive signal or the opposite-phase drive signal. The processing logic applies the carrier signal or the reference signal to the first set of TX electrodes according to the zero-sum excitation sequence.

In another embodiment, the processing logic selects a pattern for the zero-sum excitation sequence for the TX electrodes and drives each of the TX electrodes with either the in-phase drive signal, the opposite phase drive signal, or the reference according to the pattern. In another embodiment, the processing logic selects a pseudorandom sequence having a number of "one," "negative one," and "zero" values. The "one" values correspond to the in-phase drive signal, the "negative one" values correspond to the opposite-phase drive signal, and the "zero" values correspond to the reference signal; and the number of values in the pseudorandom sequence (with a zero sum) is equal to the number of TX electrodes. The processing logic applies either the in-phase drive signal, the opposite-phase drive signal, or the reference signal to the TX electrodes according to the pseudorandom sequence. This is done in one scanning stage, and then the processing logic rotates the pseudorandom sequence in subsequent scanning stages and applies either the in-phase drive signal, the opposite-phase drive signal, or the reference signal to the TX electrodes according to the rotated pseudorandom sequence in the subsequent scanning stages.

In one embodiment, the processing logic applies in-phase drive signals to alternating ones of the TX electrodes, and, at the substantially same time, applies opposite phase drive signals to the other alternating ones of the TX electrodes. Alternatively, the processing logic can apply one or more in-phase drive signals, one or more opposite-phase signals, and one or more reference signals to the TX electrodes in other patterns as would be appreciated by one of ordinary skill in the art having the benefit of this disclosure.

In the embodiments described herein, the multi-phase TX drive method (i.e., multi-phase scanning) allows noise immunity improvement for the white and narrowband noise by several times without increasing the TX voltage. The multi-phase scanning may provide the same noise immunity improvement for the noise caused by a liquid crystal display (LCD). This noise improvement may increase with an increased number, M, of panel transmitter electrodes driven at the substantially same time, increasing approximately as $M^{1/2}$. It should be noted that the multi-phase scanning may have higher computations requirements ($N*M^2$ MAC operations for every scan). The multi-phase scanning may also decrease power consumption due to driving the TX electrodes at the substantially same time, and may decrease the RX electrode current. If special phase sequences and decoding techniques are used, the MAC operations could require only addition and subtraction operations for execution.

It should be noted that FIG. 9 describes three signals being applied to the TX electrode arrays and that all RX electrodes can be sensed at the substantially same time. In other embodiments, different phase, amplitude, or frequency signals can be applied to more than one TX electrodes at the substantially same time, such as applying the in-phase signal to alternating ones of the TX electrodes and applying the opposite phase signal to the other alternating ones of the TX electrodes. In other embodiments, more than one receiver signal can be sensed at the substantially same time or in series as would be appreciated by one of ordinary skill in the art having the benefit of this disclosure.

Figure 10:
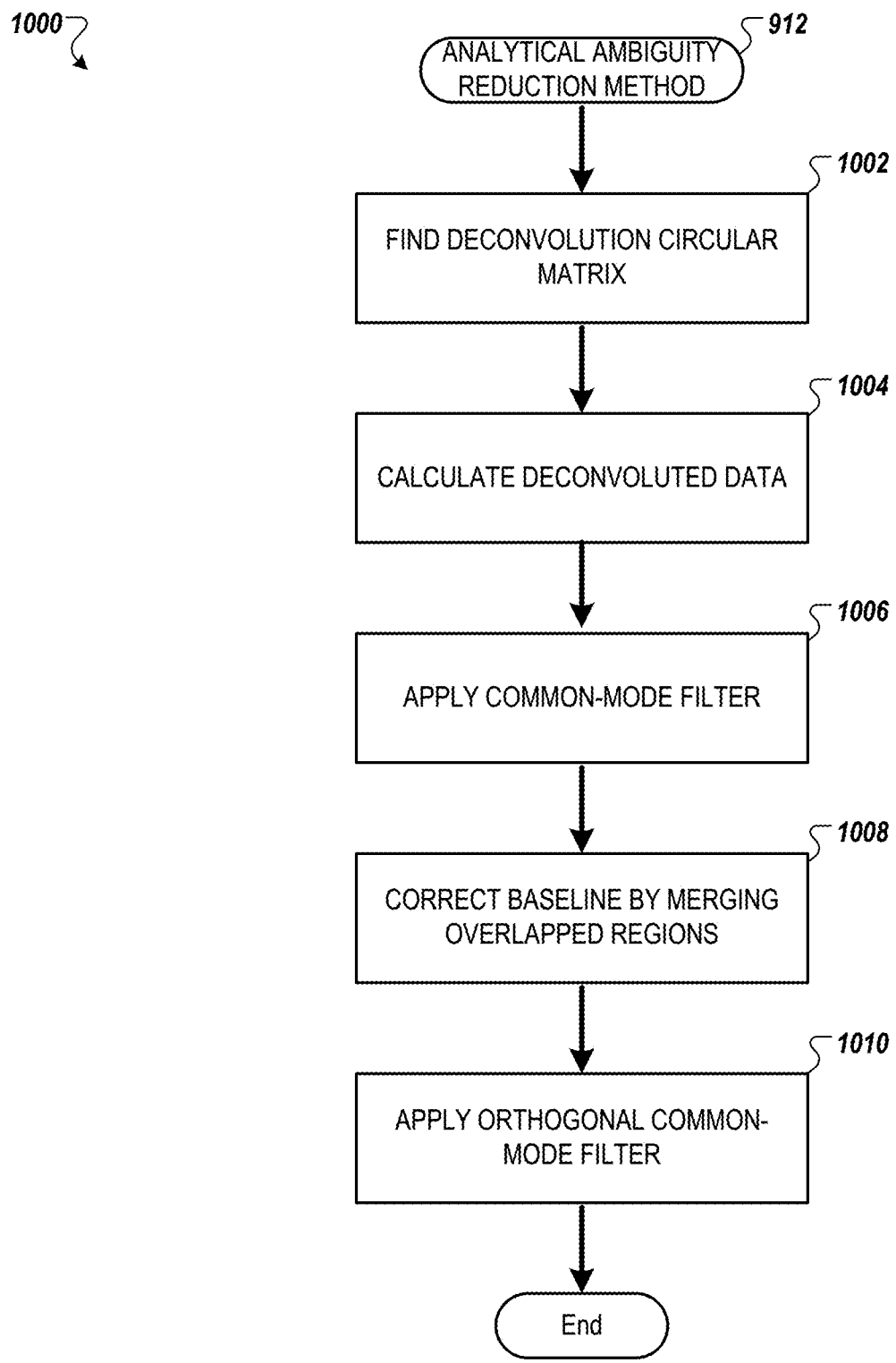
FIG. 10 is a flow diagram of a method of analytical ambiguity reduction to reconstruct a finger response on a capacitive-sensing touch panel according to one embodiment.

FIG. 10 is a flow diagram of a method 1000 of analytical ambiguity reduction to reconstruct a finger response on a capacitive-sensing touch panel according to one embodiment. Method 1000 can be performed by processing logic comprising hardware, firmware, or any combination thereof. Method 1000 can be performed by capacitance-sensing device 100 of FIG. 1. In another embodiment, method 1000 can be performed by processing device 200 and/or capacitance-sensing circuit 202 of FIG. 2. In another embodiment, method 1000 can be performed by capacitance-sensing device 400, 700, or 800 of FIG. 4 or 6-8.

Referring back to FIG. 10, method 1000 of analytical ambiguity reduction beings at block 912 of FIG. 9. Method 1000 begins by processing logic finding a deconvolution circular matrix (block 1002). The deconvolution circular matrix $H^{-1}$ is a pseudoinverse matrix of the excitation matrix H which is singular due to the zero-sum excitation sequence having a sum of zero. Processing logic calculates deconvoluted data (block 1004). Deconvoluted data refers to calculating the finger response x using Equation (5), e.g., as the deconvolution circular matrix multiplied by the measured signal s that is measured by the RX electrodes. Processing logic applies a common-mode filter to deconvoluted data on the TX electrode lines to obtain filtered data (block 1006). A common-mode filter can block high-frequency noise that may be common to two or more electrodes, while still allowing signals of the desired frequency to pass. Processing logic corrects a baseline in the filtered data by merging overlapped scanning regions (block 1008). A first scanning stage scans over a first region including a first number of TX electrodes and a second scanning stage scans over a second region including a second number of TX electrodes. In some cases, the first scan over the first region may have a first common-mode level which sets a baseline for the sense signals from the first region. The second scan over the second region may have a second common-mode level which sets a baseline for the sense signals from the second region, but the first common-mode level and the second common-mode level may not be the same, thus the baseline in the first region and the baseline in the second region may be different, causing a discontinuity in the baselines between the two regions. To resolve this issue, the first region and the second region can be scanned with an overlap, meaning that they share a common TX electrode. A difference value can be calculated as a difference between the first common mode level and the second common-mode level, and the difference value can be added to the second common-mode level to achieve a continuous baseline. Similar steps can be included for subsequent scanning stages if needed. Processing logic applies an orthogonal common-mode filter to RX electrode lines (block 1010). The orthogonal common-mode filter is the same as the common mode filter but applied to RX electrode lines instead of TX electrode lines. The method 1000 ends.

Figure 11B:
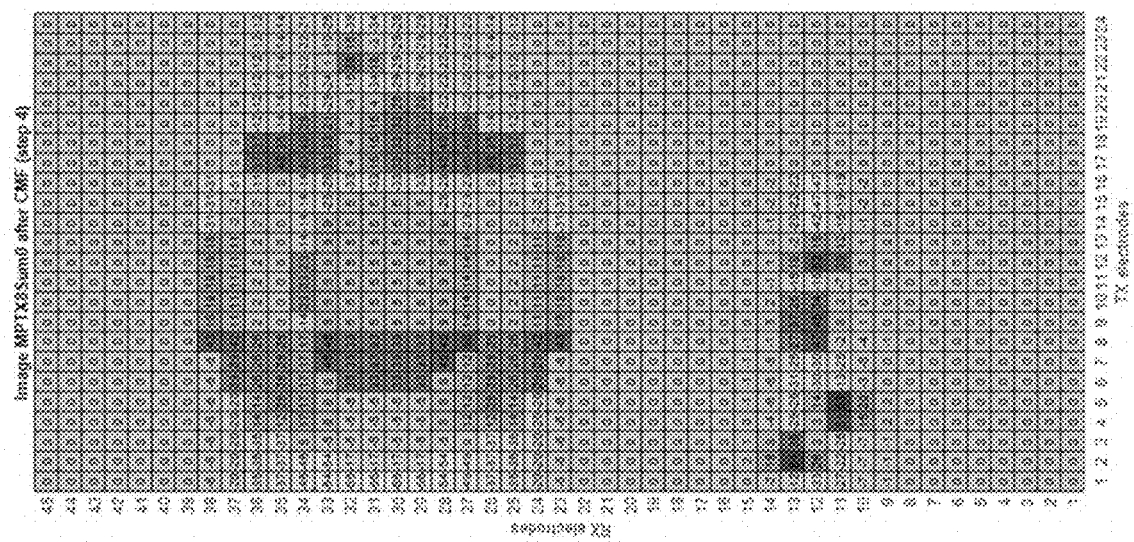
FIG. 11B is the capacitance sensor matrix showing filtered data obtained by applying a common-mode filter according to one embodiment.
Figure 11A:
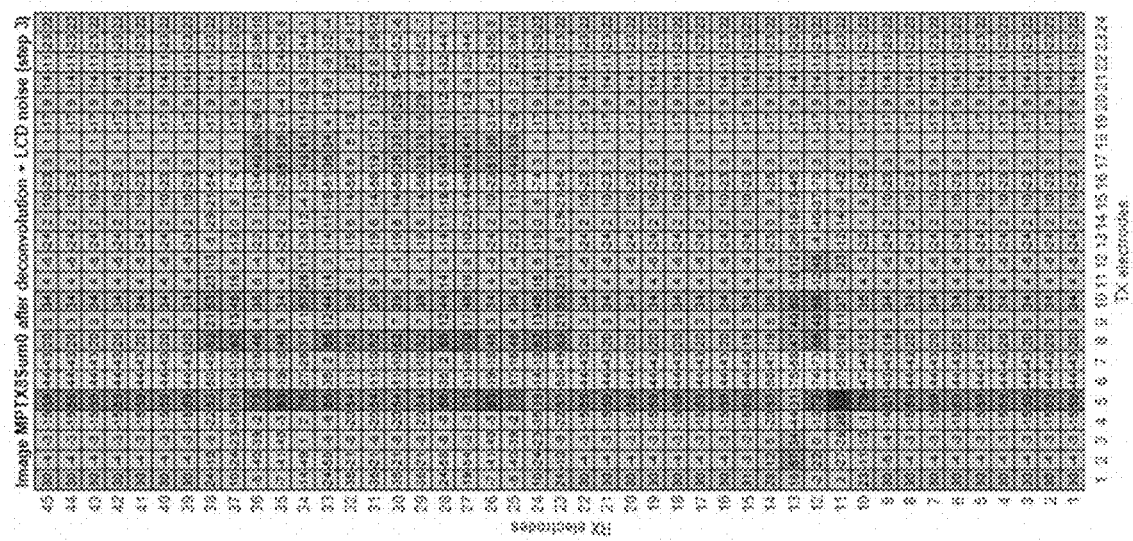
FIG. 11A is a capacitance sensor matrix showing deconvoluted data for multi-phase transmission with eight electrodes excited by a zero-sum excitation sequence according to one embodiment.

FIG. 11A is a capacitance sensor matrix 1100 showing deconvoluted data for multi-phase transmission with eight electrodes excited by a zero-sum excitation sequence according to one embodiment. The capacitance sensor matrix 1100 shows both the deconvoluted data and LCD noise. FIG. 11A corresponds to block 1004 of FIG. 10.

FIG. 11B is the capacitance sensor matrix 1100 showing filtered data obtained by applying a common-mode filter according to one embodiment. The common-mode filter blocks high-frequency noise that may be common to two or more electrodes, while still allowing signals of the desired frequency to pass. As shown in FIG. 11B, the common-mode filter filters many values to read zero. FIG. 11B corresponds to block 1006 of FIG. 10.

Figure 11D:
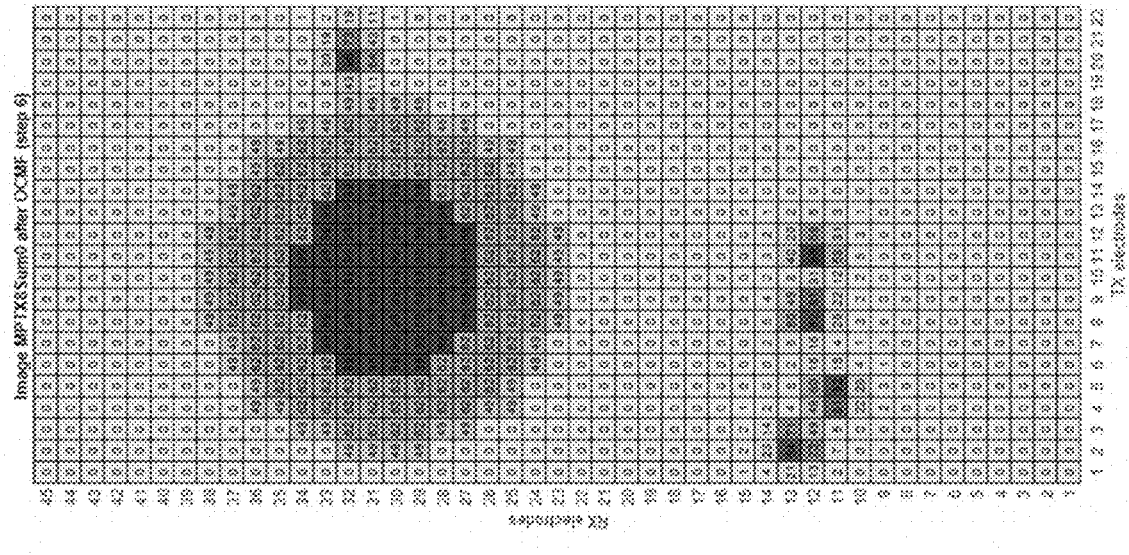
FIG. 11D is the capacitance sensor matrix showing the filtered data after applying an orthogonal common-mode filter according to one embodiment.
Figure 11C:
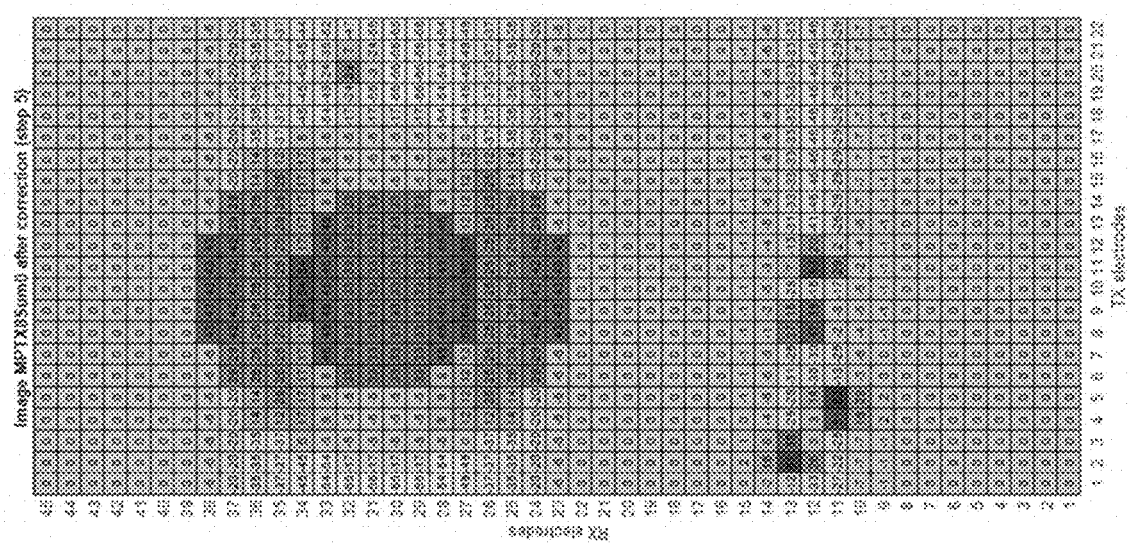
FIG. 11C is the capacitance sensor matrix showing the filtered data after restoring a common-mode value along the set of RX electrodes to correct the baseline according to one embodiment.

FIG. 11C is the capacitance sensor matrix 1100 showing the filtered data after restoring a common-mode value along the set of RX electrodes to correct the baseline according to one embodiment. FIG. 11C corresponds to block 1008 of FIG. 10.

FIG. 11D is the capacitance sensor matrix 1100 showing the filtered data after applying an orthogonal common-mode filter according to one embodiment. The orthogonal common-mode filter removes artifacts along the set of RX electrodes to obtain a capacitance map of the touch panel. FIG. 11D corresponds to block 1010 of FIG. 10. As shown by FIG. 11D the capacitance map clearly maps a finger touch on the touch panel.

Figure 12A:
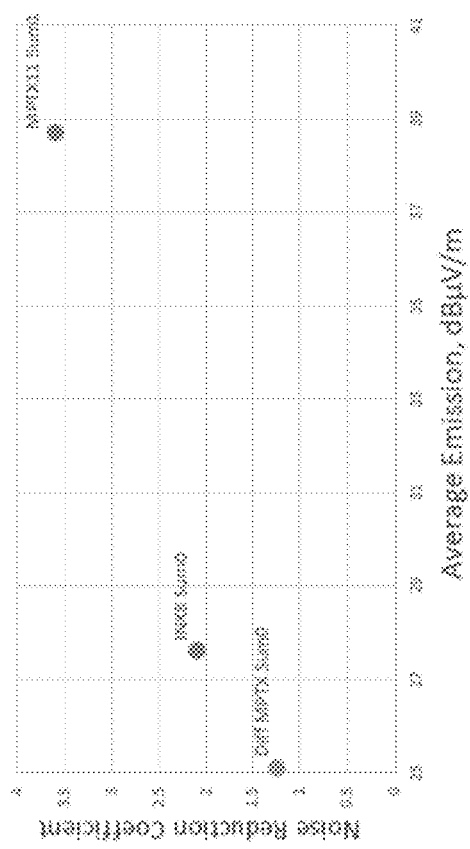
FIG. 12A is a graph comparing a relation between noise reduction coefficient and peak emission for three methods of multi-phase transmitting according to one embodiment.

FIG. 12A is a graph comparing a relation between noise reduction coefficient and peak emission for three methods of multi-phase transmitting according to one embodiment. The three methods of multi-phase transmitting are: 1) MPTX11 Sum1 which refers to multi-phase transmit with eleven TX electrodes and an excitation sequence with a sum of one; 2) MPTX8 Sum0 which refers to multi-phase transmit with eight TX electrodes and an excitation sequence with a sum of zero (this is the method described herein); and 3) Differential MPTX Sum0 which refers to multi-phase transmit with two electrodes and an excitation sequence with a sum of zero. A higher noise reduction coefficient corresponds to a higher SNR which is desirable. As described above, a lower peak emission (electromagnetic emission) is desirable. It should be noted that emission is measured for the first harmonic. As shown in FIG. 12A, the MPTX11 Sum1 gives the best SNR but also the highest peak emission. The peak emission for the MPTX11 Sum1 exceeds electromagnetic emission limitations. The MPTX8 Sum0 gives a noise reduction coefficient of approximately two and a peak emission of approximately 41 dBµV/m. It should be noted that a noise reduction coefficient of two means, for example, that white noise is decreased by two times. The differential MPTX Sum0 has the lowest peak emission, but also the smallest noise reduction coefficient, and thus the lowest SNR. The SNR for the differential MPTX Sum0 may be too low for practical touch screen applications. Thus the multi-phase exciting and scanning with zero-sum excitation sequences for touch panels described herein offers both a good SNR and a sufficiently low peak emission.

Figure 12B:
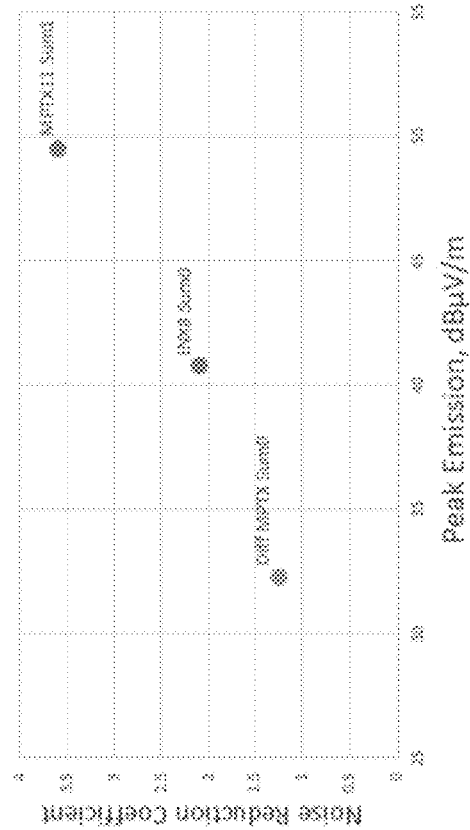
FIG. 12B is a graph comparing a relation between noise reduction coefficient and average emission for the three methods described in FIG. 12A.

FIG. 12B is a graph comparing a relation between noise reduction coefficient and average emission for the three methods described in FIG. 12A. Again, the multi-phase exciting and scanning with zero-sum excitation sequences (MPTX8 Sum0) offers both a good SNR and a sufficiently low average emission.

Figure 13:
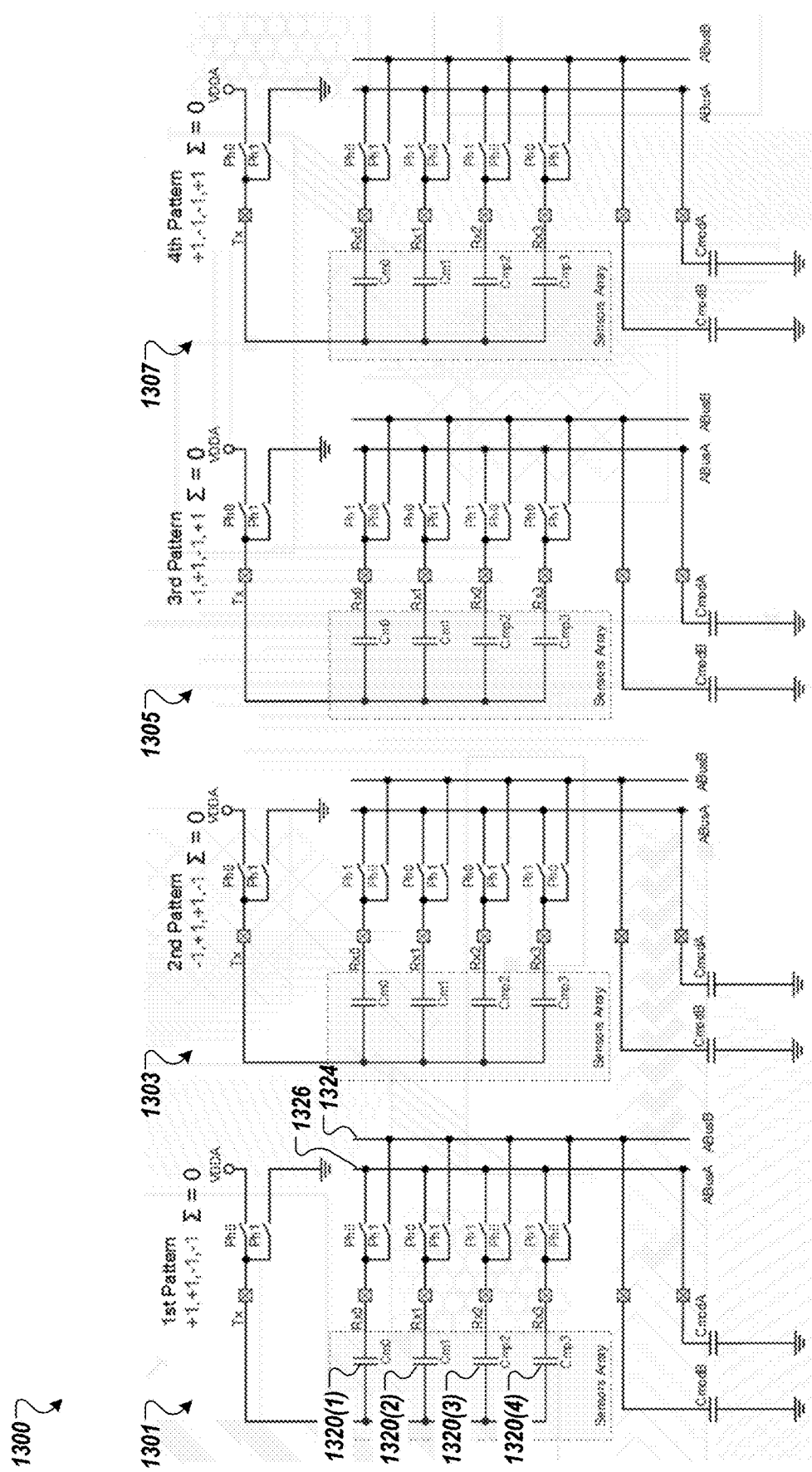
FIG. 13 is a series of schematic diagrams showing zero-sum multi-phase receivers 1300 according to one embodiment.

FIG. 13 is a series of schematic diagrams showing zero-sum multi-phase receivers 1300 according to one embodiment. Zero-sum multi-phase receiving uses the same or similar idea including the analytical ambiguity reduction method similar to zero-sum multi-phase transmitting. It should be noted that when touch cannot be detected if all sensors are covered. In the embodiment depicted in FIG. 13, there are four receive sensors, but in other embodiments, there can be more or fewer sensors.

Zero-sum multi-phase receiver 1301 can include a zero-sum receive sequence corresponding to touches or capacitances due to capacitors 1320 that make up a sensor array. The receive sequence shown in 1310 is {+1, +1, −1, −1} (with a sum of zero) corresponding to receiving an in-phase signal from capacitor 1320(1), an in-phase signal from capacitor 1320(2), an opposite-phase signal from capacitor 1320(3), and an opposite-phase signal from capacitor 1320(4). The signals corresponding to the receive sequence can be passed to an ABusB line 1324 and ABusA line 1325 and received by an RX signal receiver, such as RX signal receiver 114 of FIG. 1.

In a similar manner, zero-sum multi-phase receiver 1303 includes a zero-sum receive sequence corresponding to touches or capacitances due to capacitors 1320 that make up the sensor array. The receive sequence shown is {−1, +1, +1, −1} (with a sum of zero) corresponding to receiving an opposite-phase signal from capacitor 1320(1), an in-phase signal from capacitor 1320(2), an in-phase signal from capacitor 1320(3), and an opposite-phase signal from capacitor 1320(4). The zero-sum multi-phase receiver 1305 has a receive sequence of {−1, +1, −1, +1} corresponding to receiving an opposite-phase signal from capacitor 1320(1), an in-phase signal from capacitor 1320(2), an opposite-phase signal from capacitor 1320(3), and an in-phase signal from capacitor 1320(4). The zero-sum multi-phase receiver 1307 has a receive sequence of {+1, −1, −1, +1} corresponding to receiving an in-phase signal from capacitor 1320(1), an opposite-phase signal from capacitor 1320(2), an opposite-phase signal from capacitor 1320(3), and an in-phase signal from capacitor 1320(4).

Figure 14:
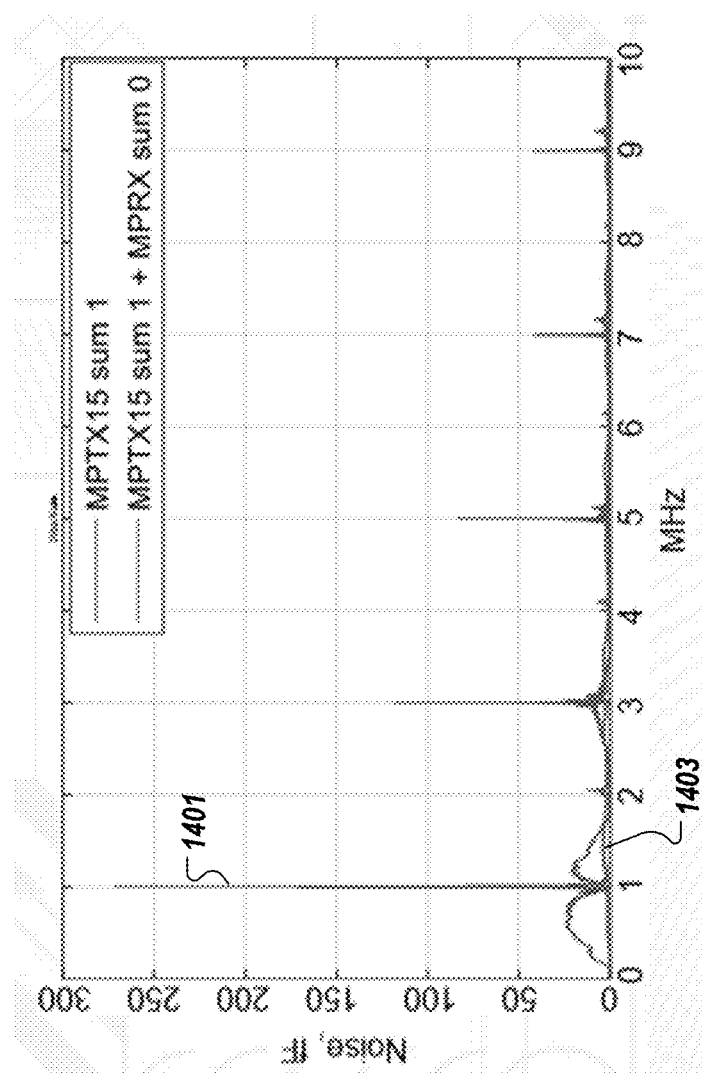
FIG. 14 is a graph illustrating a noise comparison between received sense signals with and without zero-sum multi-phase receiving according to one embodiment.

FIG. 14 is a graph illustrating a noise comparison between received sense signals with and without zero-sum multi-phase receiving according to one embodiment. In one case, an external noise source is applied, and sense signals are received via RX electrodes. In the case of curve 1401, zero-sum multi-phase receiving is not applied, and in the case of curve 1403, zero-sum multi-phase receiving is applied. At the first harmonic applying the zero-sum multi-phase, receiving can reduce noise by approximately twenty times, thus demonstrating superior electromagnetic immunity.

It is worth noting that multi-phase RX and multi-phase TX are can used together in conjunction, or either of them separately. Both multi-phase RX and multi-phase TX use similar algorithms (e.g., analytical ambiguity reduction method) for signal reconstruction. Further, multi-phase RX and multi-phase TX scanning can be applied in any order, and the order can be selected based on implementation flexibility or optimization demands. Multi-phase TX/RX technique can permit reaching a theoretical value of the equivalent integration time that is comparable with a panel scanning time using only one measuring channel.

Figure 15:
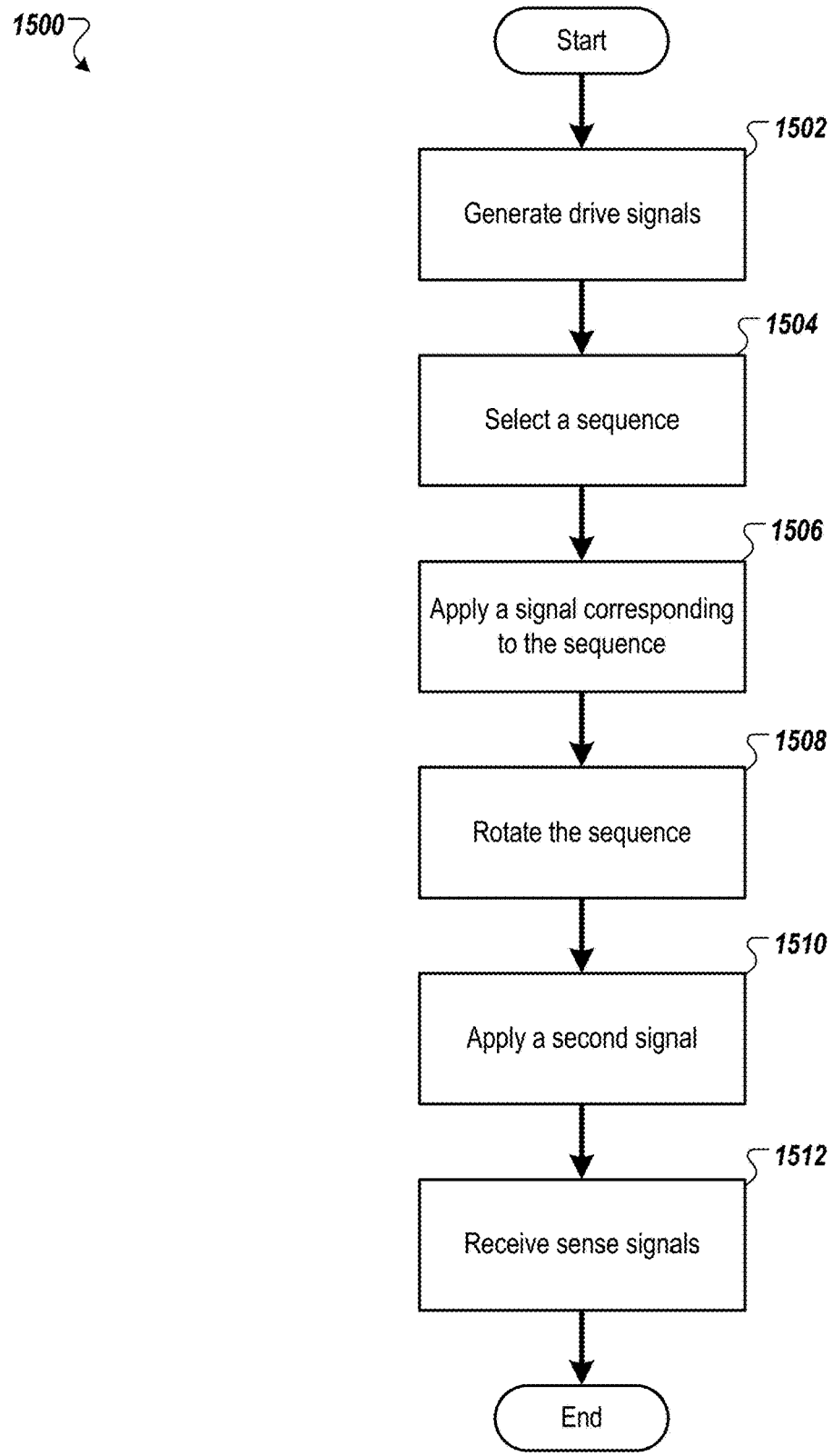
FIG. 15 is a flow diagram of a method of zero-sum multi-phase transmitting according to one embodiment.

FIG. 15 is a flow diagram of a method 1500 of zero-sum multi-phase transmitting according to one embodiment. Method 1500 can be performed by processing logic comprising hardware, firmware, or any combination thereof. Method 1500 can be performed by capacitance-sensing device 100 of FIG. 1. In another embodiment, method 1500 can be performed by processing device 200 and/or capacitance-sensing circuit 202 of FIG. 2. In another embodiment, method 1500 can be performed by capacitance-sensing device 400, 700, or 800 of FIG. 4 or 6-8.

Referring back to FIG. 15, method 1500 begins by processing logic generating an in-phase drive signal and an opposite-phase drive signal (block 1502). Processing logic selects a sequence (block 1504). The sequence can have a number of positive one values, negative one values, and zero values, corresponding to the in-phase driving signal, the opposite-phase drive, signal, and a reference signal respectively. The reference signal can be from a voltage potential or a ground potential. A sum of the sequence is zero. Processing logic applies at least one of the in-phase drive signal, the opposite-phase drive signal, or the reference signal according to the sequence. The in-phase signal, the opposite-phase signal, and the reference signal are applied substantially simultaneously to a first set of TX electrodes at a first scanning stage (block 1506). Processing logic rotates the sequence to obtain a rotated sequence (block 1508). Processing logic applies at least one of the in-phase drive signal, the opposite-phase drive signal, or the reference signal according to the rotated sequence at a second scanning stage (block 1510). The in-phase signal, the opposite-phase signal, and the reference signal are applied substantially simultaneously to a second set of TX electrodes. Processing logic receives sense signals from a set of RX electrodes (block 1512). The sense signals can be to detect a presence of an object on a touch panel, and the sense signals can be representative of capacitance associated with the set of receiver electrodes of the touch panel. The method 1500 ends.

In some embodiments, the TX electrodes and the RX electrodes are the same electrodes, and the sense signals represent self-capacitances associated with the set of RX electrodes. In other embodiments, the TX electrodes and the RX electrodes are different electrodes, and the sense signals represent mutual capacitances of intersections between TX electrodes and RX electrodes.

In some embodiments, the number of TX electrodes is even and the sum of the sequence, which includes one or more positive one values, one or more negative one values, and one or more zero values, is zero. In other embodiments, the number of TX electrodes is odd and the sum of the sequence, which includes one or more positive one values, one or more negative one values, and one or more zero values, is zero.

In further embodiments, the first set of TX electrodes and the second set of TX electrodes include a common electrode, in particular, for overlapped scanning. The first scanning stage and the second scanning stage may be sequential. Processing logic may perform an analytical ambiguity reduction method to align a common-mode level (e.g., between the first set of TX electrodes and the second set of TX electrodes) to form a baseline. Overlapped scanning can allow for forming a continuous baseline between a first scanning stage and a second scanning stage.

Processing logic can perform the analytical ambiguity reduction method. The analytical ambiguity reduction method is described with respect to FIG. 10. Processing logic determines a deconvolution circular matrix which is a pseudoinverse matrix of an excitation matrix, which includes at least the sequence and the rotated sequence. It is worth noting that the excitation matrix is a singular matrix, due to the sum of the sequence being zero, and the sum of the rotated sequence being zero. Processing logic calculates deconvoluted data using the deconvolution circular matrix and the sense signals. Processing logic can apply a common-mode filter to the deconvoluted dated to obtain filtered data. Processing logic can restore a common value along the set of RX electrodes to correct a baseline in the filter data. Correcting a baseline may refer to establishing a common-mode value between the first scanning stage and the second scanning stage in order to obtain a continuous baseline. Processing logic can apply an orthogonal common-mode filter to remove artifacts along the set of RX electrodes and obtain a capacitance map of the touch panel. The capacitance map refers to a direct image of a finger (or other conductive objects) touch on the touch panel.

Figure 16:
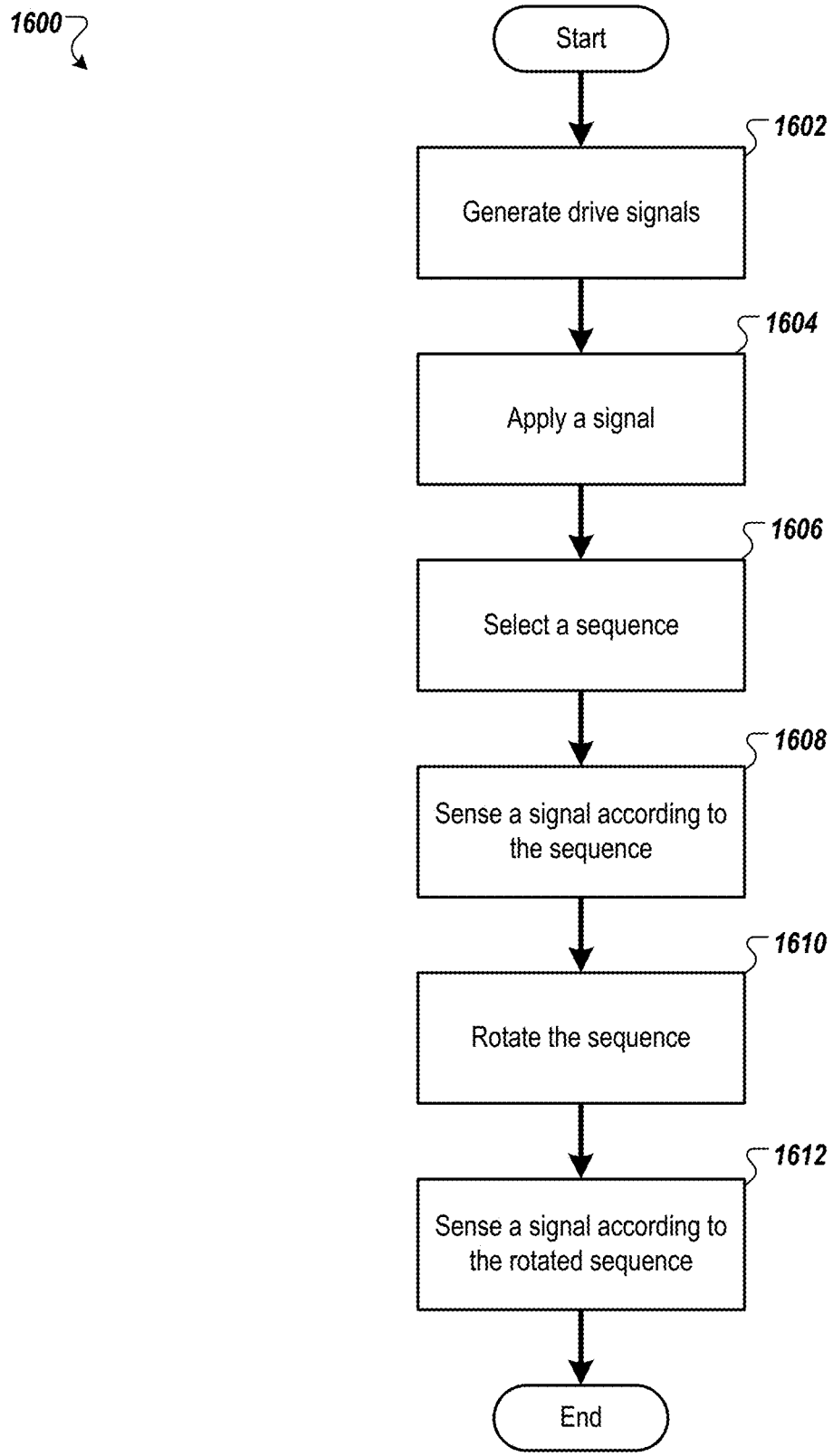
FIG. 16 is a flow diagram of a method of zero-sum multi-phase receiving according to one embodiment.

FIG. 16 is a flow diagram of a method 1600 of zero-sum multi-phase receiving according to one embodiment. Method 1600 can be performed by processing logic comprising hardware, firmware, or any combination thereof. Method 1600 can be performed by capacitance-sensing device 100 of FIG. 1. In another embodiment, method 1600 can be performed by processing device 200 and/or capacitance-sensing circuit 202 of FIG. 2. In another embodiment, method 1600 can be performed by capacitance-sensing device 400, 700, or 800 of FIG. 4 or 6-8.

Referring back to FIG. 16, method 1600 begins by processing logic generating an in-phase drive signal and an opposite-phase drive signal (block 1602). Processing logic applies a signal to each TX electrode of a set of TX electrodes (block 1604). Processing logic selects a sequence (block 1606). The sequence can have a number of positive one values, negative one values, and zero values, corresponding to the in-phase driving signal, the opposite-phase drive, signal, and a reference signal respectively. The reference signal can be from a voltage potential or a ground potential. A sum of the sequence is zero. Processing logic senses at substantially the same time at each of a first set of receiver electrodes at a first stage of a set of scanning stages one of the in-phase drive signal, the opposite-phase drive signal, or the reference signal according to the sequence. Processing logic rotates the sequence to obtain a rotated sequence. Processing logic senses at substantially the same time at each of a second set of receiver electrodes at a second stage of a set of scanning stages one of the in-phase drive signal, the opposite-phase drive signal, or the reference signal according to the rotated sequence In some embodiments, the RX electrodes and the RX electrodes are the same electrodes, and the sense signals represent self-capacitances associated with the first and second set of RX electrodes. In other embodiments, the TX electrodes and the RX electrodes are different electrodes, and the sense signals represent mutual capacitances of intersections between TX electrodes and RX electrodes.

In some embodiments, the number of RX electrodes is even and the sum of the sequence, which includes one or more positive one values, one or more negative one values, and one or more zero values, is zero. In other embodiments, the number of RX electrodes is odd and the sum of the sequence, which includes one or more positive one values, one or more negative one values, and one or more zero values, is zero.

In further embodiments, the first set of RX electrodes and the second set of RX electrodes include a common electrode, in particular, for overlapped scanning. The first scanning stage and the second scanning stage may be sequential. Processing logic may perform an analytical ambiguity reduction method to align a common-mode level (e.g., between the first set of RX electrodes and the second set of RX electrodes) to form a baseline. Overlapped scanning can allow for forming a continuous baseline between a first scanning stage and a second scanning stage.

Processing logic can perform the analytical ambiguity reduction method. The analytical ambiguity reduction method is described with respect to FIG. 10. Processing logic determines a deconvolution circular matrix which is a pseudoinverse of an excitation matrix, which includes at least the sequence and the rotated sequence. It is worth noting that the excitation matrix is a singular matrix, due to the sum of the sequence being zero, and the sum of the rotated sequence being zero. Processing logic calculates deconvoluted data using the deconvolution circular matrix and the sense signals (digital data corresponding to the sense signals). Processing logic can apply a common-mode filter to the deconvoluted data to obtain filtered data. Processing logic can restore a common value along the first and second sets of RX electrodes to correct a baseline in the filter data. Correcting a baseline may refer to establishing a common-mode value between the first scanning stage and the second scanning stage in order to obtain a continuous baseline. Processing logic can apply an orthogonal common-mode filter to remove artifacts along the set of RX electrodes and obtain a capacitance map of the touch panel. The capacitance map refers to a direct image of a finger (or other conductive objects) touch on the touch panel.

Figure 17:
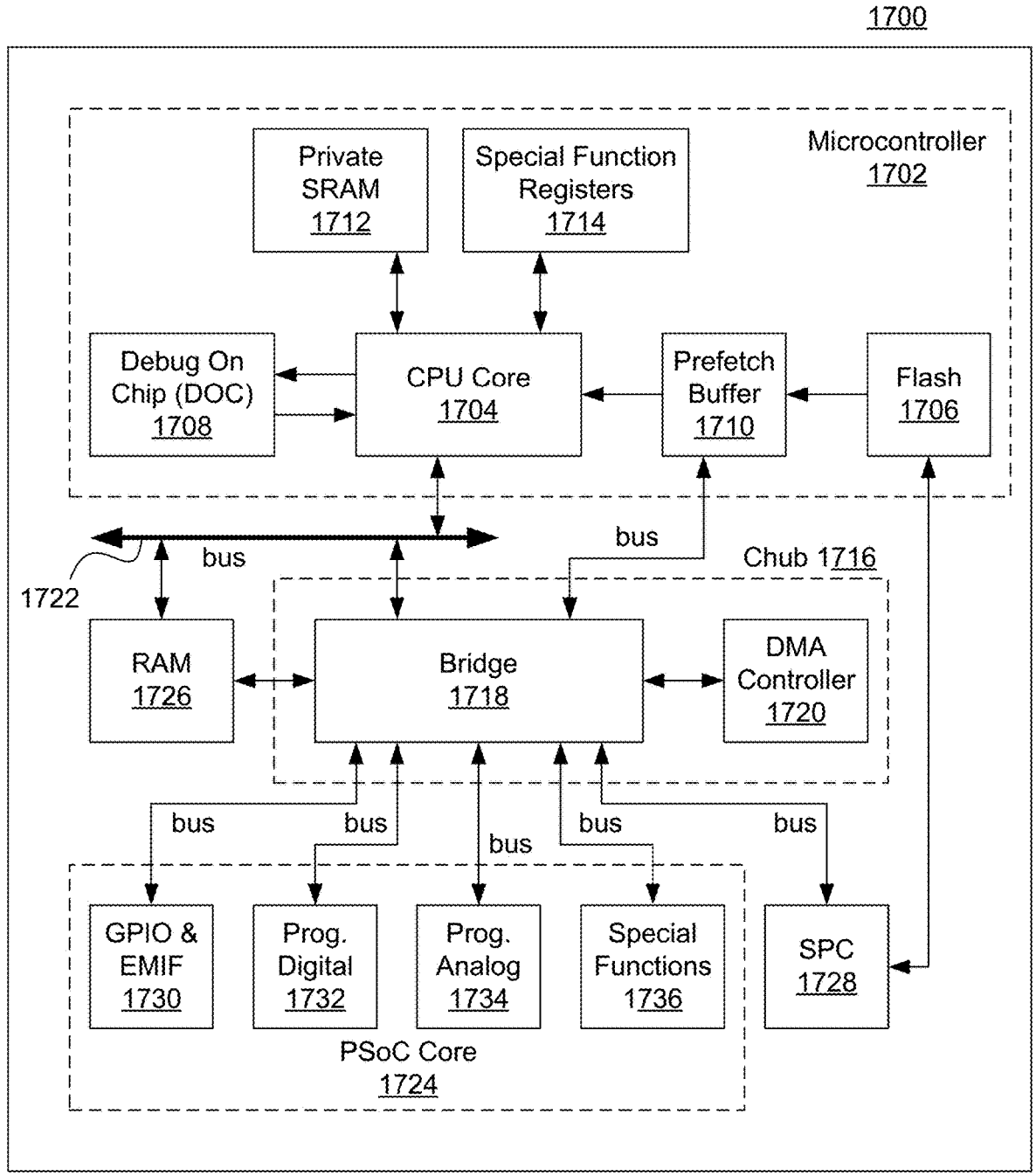
FIG. 17 illustrates an embodiment of a core architecture of the PSoC® processing device, such as that used in the PSoC3® family of products offered by Cypress Semiconductor Corporation (San Jose, California).

FIG. 17 illustrates an embodiment of a core architecture 1700 of the PSoC® processing device, such as that used in the PSoC3® family of products offered by Cypress Semiconductor Corporation (San Jose, California). In one embodiment, the core architecture 1700 includes a microcontroller 1702. The microcontroller 1702 includes a CPU (central processing unit) core 1704, flash program storage 1706, DOC (debug on-chip) 1708, a prefetch buffer 1710, a private SRAM (static random access memory) 1712, and special functions registers 1714. In an embodiment, the DOC 1708, prefetch buffer 1710, private SRAM 1712, and special function registers 1714 are coupled to the CPU core 1704, while the flash program storage 1706 is coupled to the prefetch buffer 1710.

The core architecture 1700 may also include a CHub (core hub) 1716, including a bridge 1718 and a DMA controller 1720 that is coupled to the microcontroller 1702 via bus 1722. The CHub 1716 may provide the primary data and control interface between the microcontroller 1702 and its peripherals and memory, and a programmable core 1724. In one embodiment, the capacitance-sensing circuitry 202 of FIG. 3A may be implemented in the core architecture 1700, such as part of the programmable core 1724. The DMA controller 1720 may be programmed to transfer data between system elements without burdening the CPU core 1704. In various embodiments, each of these subcomponents of the microcontroller 1702 and CHub 1716 may be different with each choice or type of CPU core 1704. The CHub 1716 may also be coupled to shared SRAM 1726 and an SPC (system performance controller) 1728. The private SRAM 1712 is independent of the shared SRAM 1726 that is accessed by the microcontroller 1702 through the bridge 1718. The CPU core 1704 accesses the private SRAM 1712 without going through the bridge 1718, thus allowing local register and RAM accesses to occur simultaneously with DMA access to shared SRAM 1726. Although labeled here as SRAM, these memory modules may be any suitable type of a wide variety of (volatile or non-volatile) memory or data storage modules in various other embodiments.

In various embodiments, the programmable core 1724 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1724 includes a GPIO (general purpose IO) and EMIF (extended memory interface) block 1730 to provide a mechanism to extend the external off-chip access of the microcontroller 1702, a programmable digital block 1732, a programmable analog block 1734, and a special functions block 1736, each configured to implement one or more of the subcomponent functions. In various embodiments, the special functions block 1736 may include dedicated (non-programmable) functional blocks and/or include one or more interfaces to dedicated functional blocks, such as USB, a crystal oscillator drive, JTAG, and the like.

The programmable digital block 1732 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1732 may be configured to perform various digital functions, including, but not limited to, one or more of the following functions: a basic I2C slave; an I2C master; an SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level-sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1704) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1734 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 134 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

It should be noted that the embodiments described above use an in-phase signal, opposite phase signal, and a reference signal. The in-phase and opposite phases may be used when using inverters or complementary output stages to generate these signals. Also, the in-phase and opposite phase signals may be used for simplifying the measurement by the ADC as +1 or −1 data signs. However, in other embodiments, different arbitrary phase signals may be used. For example, an in-phase signal and one or more out-of-phase signals may be used.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time-multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other forms of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
generating an in-phase drive signal and an opposite-phase drive signal;
selecting a sequence having a number of one values, negative one values, and zero values, wherein the one values correspond to the in-phase drive signal, the negative one values correspond to the opposite-phase drive signal, and the zero values correspond to a reference signal, wherein the reference signal is from a voltage potential or a ground potential, and wherein a sum of the sequence is equal to zero;
applying, at a substantially same time to each of a first set of transmitter electrodes at a first stage of a plurality of scanning stages, (i) at least one of the in-phase drive signal or the opposite-phase drive signal and (ii) the reference signal according to the sequence;
rotating the sequence to obtain a rotated sequence;
applying, at a substantially same time to each of a second set of transmitter electrodes at a second stage of the plurality of scanning stages, (i) at least one of the in-phase drive signal or the opposite-phase drive signal and (ii) the reference signal according to the rotated sequence; and
receiving sense signals from a set of receiver electrodes to detect a presence of an object on a touch panel, wherein the sense signals represent capacitances associated with the set of receiver electrodes.

2. The method of claim 1, wherein the transmitter electrodes and the receiver electrodes are the same electrodes, and wherein the sense signals represent self-capacitances of the set of receiver electrodes.

3. The method of claim 1, wherein the transmitter electrodes and the receiver electrodes are different electrodes, and wherein the sense signals represent mutual capacitances of intersections of the transmitter electrodes and the receiver electrodes.

4. The method of claim 1, wherein the sequence comprises one or more one values, one or more negative one values, and one or more zero values when there are an odd number of transmitter electrodes.

5. The method of claim 1, wherein the first set of transmitter electrodes and the second set of transmitter electrodes comprises a common electrode, wherein the first stage and the second stage are sequential, wherein the method further comprises performing an analytical ambiguity reduction process to align a common-mode level to form a baseline.

6. The method of claim 5, wherein performing the analytical ambiguity reduction process comprises:
determining a deconvolution circular matrix that is a pseudoinverse matrix of an excitation matrix comprising the sequence and the rotated sequence;
calculating deconvoluted data using the deconvolution circular matrix and the sense signals;
applying a common mode filter to the deconvoluted data to obtain filtered data;
restoring a common value along the set of receiver electrodes to correct the baseline in the filtered data; and
applying an orthogonal common mode filter to remove artifacts along the set of receiver electrodes to obtain a capacitance map of the touch panel.

7. A method comprising:
generating an in-phase drive signal and an opposite-phase drive signal;
applying, to each of a set of transmitter electrodes, a signal;

selecting a sequence having a number of one values, negative one values, and zero values, wherein the one values correspond to the in-phase drive signal, the negative one values correspond to the opposite-phase drive signal, and the zero values correspond to a reference signal, wherein the reference signal is from a voltage potential or a ground potential, and wherein a sum of the sequence is equal to zero;

sensing, at a substantially same time at each of a first set of receiver electrodes at a first stage of a plurality of scanning stages, (i) one of the in-phase drive signal or the opposite-phase drive signal and (ii) the reference signal according to the sequence;

rotating the sequence to obtain a rotated sequence; and sensing, at a substantially same time at each of a second set of receiver electrodes at a second stage of the plurality of scanning stages, (i) one of the in-phase drive signal or the opposite-phase drive signal and (ii) the reference signal according to the rotated sequence.

8. The method of claim 7, wherein the transmitter electrodes and the receiver electrodes are the same electrodes, and wherein sense signals represent self-capacitances of the first set of receiver electrodes and the second set of receiver electrodes.

9. The method of claim 7, wherein the transmitter electrodes and the receiver electrodes are different electrodes, and wherein the sense signals represent mutual capacitances of intersections of the transmitter electrodes and the receiver electrodes.

10. The method of claim 7, wherein the sequence comprises one or more one values, one or more negative one values, and one or more zero values when there are an odd number of receiver electrodes.

11. The method of claim 7, wherein the first set of receiver electrodes and the second set of receiver electrodes comprises a common electrode, wherein the first stage and the second stage are sequential, wherein the method further comprises performing an analytical ambiguity reduction process to align a common-mode level to form a baseline.

12. The method of claim 11, wherein performing the analytical ambiguity reduction process comprises:

determining a deconvolution circular matrix that is a pseudoinverse matrix of an excitation matrix comprising the sequence and the rotated sequence;

calculating deconvoluted data using the deconvolution circular matrix and sense signals;

applying a common mode filter to the deconvoluted data to obtain filtered data;

restoring a common value along the first set of receiver electrodes and the second set of receiver electrodes to correct the baseline; and applying an orthogonal common mode filter to remove artifacts along the first set of receiver electrodes and the second set of receiver electrodes to obtain a capacitance map of a touch panel.

13. An apparatus comprising:

capacitance-sensing circuitry configured to:

select a sequence having a number of one values, negative one values, and zero values, wherein the one values correspond to an in-phase drive signal, the negative one values correspond to an opposite-phase drive signal, and the zero values correspond to a reference signal, wherein the reference signal is from a voltage potential or a ground potential, and wherein a sum of the sequence is equal to zero;

apply, to each of a first set of transmitter electrodes of a touch panel at a first scanning stage, (i) one of the in-phase drive signal or the opposite-phase drive signal and (ii) the reference signal according to the sequence;

rotate the sequence to obtain a rotated sequence;

apply, to each of a second set of transmitter electrodes of the touch panel at a second scanning stage subsequent to the first scanning stage, (i) one of the in-phase drive signal or the opposite-phase drive signal and (ii) the reference signal according to the rotated sequence; and receive sense signals from a set of receiver electrodes of the touch panel to detect a presence of an object on the touch panel, wherein the sense signals represent capacitances associated with the set of receiver electrodes.

14. The apparatus of claim 13, wherein the capacitance-sensing circuitry comprises:

selection circuitry configured to couple to the first set of transmitter electrodes and the second set of transmitter electrodes and the set of receiver electrodes;

a signal generator coupled to the selection circuitry, the signal generator to generate the in-phase drive signal and the opposite-phase drive signal;

the reference or ground potential to provide the reference signal;

sensing circuitry coupled to the selection circuitry;

analog-to-digital converter (ADC) circuitry coupled to the sensing circuitry; and a processing core coupled to the selection circuitry.

15. The apparatus of claim 14, further comprising:

a signal source;

in-phase circuitry coupled to the signal source and to generate the in-phase drive signal;

opposite-phase circuitry coupled to the signal source and to generate the opposite-phase drive signal, and wherein the selection circuitry comprises:

a first set of multiplexers configured to couple to the first set of the transmitter electrodes at the first scanning stage, wherein each of the first set of transmitter electrodes is coupled to the in-phase circuitry, the opposite-phase circuitry, and the reference or ground potential; and a second set of multiplexers configured to couple to the second set of the transmitter electrodes at the second scanning stage, wherein each of the second set of electrodes is coupled to the in-phase circuitry, the opposite-phase circuitry, and the reference or ground potential, and wherein the first and the second sets comprises a common electrode.

16. The apparatus of claim 14, wherein the processing core is further to:

receive, from the ADC circuitry, digital data corresponding to the sense signals;

determine a deconvolution circular matrix that is a pseudoinverse matrix of an excitation matrix comprising the sequence and the rotated sequence;

calculate deconvoluted data using the deconvolution circular matrix and the digital data;

apply a common mode filter to the deconvoluted data to obtain filtered data;

restore a common value along the set of receiver electrodes to correct a baseline in the filtered data; and apply an orthogonal common mode filter to remove artifacts along the set of receiver electrodes to obtain a capacitance map of the touch panel.

17. An apparatus comprising:
capacitance-sensing circuitry configured to:
- apply, to each of a set of transmitter electrodes, a signal;
- select a sequence having a number of one values, negative one values, and zero values, wherein the one values correspond to an in-phase drive signal, the negative one values correspond to an opposite-phase drive signal, and the zero values correspond to a reference signal, wherein the reference signal is from a voltage potential or a ground potential, and wherein a sum of the sequence is equal to zero;
- sense, at each of a first set of receiver electrodes at a first stage of a plurality of scanning stages, (i) one of the in-phase drive signal or the opposite-phase drive signal and (ii) the reference signal according to the sequence;
- rotate the sequence to obtain a rotated sequence; and
- sense, at each of a second set of receiver electrodes at a second stage of the plurality of scanning stages, (i) one of the in-phase drive signal or the opposite-phase drive signal and (ii) the reference signal according to the rotated sequence.

18. The apparatus of claim 17, wherein the capacitance-sensing circuitry comprises:
- selection circuitry configured to couple to the set of transmitter electrodes and the first set of receiver electrodes and the second set of receiver electrodes;
- a signal generator coupled to the selection circuitry, the signal generator to generate the in-phase drive signal and the opposite-phase drive signal;
- the reference or ground potential to provide the reference signal;
- sensing circuitry coupled to the selection circuitry;
- analog-to-digital converter (ADC) circuitry coupled to the sensing circuitry; and
- a processing core coupled to the selection circuitry.

19. The apparatus of claim 18, further comprising:
- a signal source;
- in-phase circuitry coupled to the signal source and to generate the in-phase drive signal;
- opposite-phase circuitry coupled to the signal source and to generate the opposite-phase drive signal, and wherein the selection circuitry comprises:
  - a first set of multiplexers configured to couple to the first set of receiver electrodes at the first stage, wherein each of the first set of receiver electrodes is coupled to the in-phase circuitry, the opposite-phase circuitry, and the reference or ground potential; and
  - a second set of multiplexers configured to couple to the second set of receiver electrodes at the second stage, wherein each of the second set of receiver electrodes is coupled to the in-phase circuitry, the opposite-phase circuitry, and the reference or ground potential, and wherein the first set of receiver electrodes and the second set of receiver electrodes comprises a common electrode.

20. The apparatus of claim 18, wherein the processing core is further to:
- receive, from the ADC circuitry, digital data corresponding to sense signals;
- determine a deconvolution circular matrix that is a pseudoinverse matrix of an excitation matrix comprising the sequence and the rotated sequence;
- calculate deconvoluted data using the deconvolution circular matrix and the digital data;
- apply a common mode filter to the deconvoluted data to obtain filtered data;
- restore a common value along the first set of receiver electrodes and the second set of receiver electrodes to correct a baseline in the filtered data; and
- apply an orthogonal common mode filter to remove artifacts along the first set of receiver electrodes and the second set of receiver electrodes to obtain a capacitance map of a touch panel.

* * * * *